(12) United States Patent
Vincent et al.

(10) Patent No.: US 10,166,471 B2
(45) Date of Patent: *Jan. 1, 2019

(54) SYSTEM, METHOD, AND GRAPHICAL USER INTERFACE FOR CONTROLLING AN APPLICATION ON A TABLET

(71) Applicant: Sony Interactive Entertainment America LLC, San Mateo, CA (US)

(72) Inventors: Joshuah Vincent, San Francisco, CA (US); Nico Benitez, Los Angeles, CA (US); Emily Adams, Fremont, CA (US); Jan Chong, San Francisco, CA (US); Ryan Cook, Mountain View, CA (US); Paul Marshall, Cupertino, CA (US); Pierpaolo Baccichet, San Francisco, CA (US); Matt Piotrowski, San Francisco, CA (US); Collin Carey, Menlo Park, CA (US); Kevin Koleckar, Mountain View, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,589

(22) Filed: Oct. 30, 2017

(65) Prior Publication Data
US 2018/0140948 A1    May 24, 2018

Related U.S. Application Data

(63) Continuation of application No. 13/797,039, filed on Mar. 12, 2013, now Pat. No. 9,868,062.

(Continued)

(51) Int. Cl.
| | | |
|---|---|---|
| A63F 13/42 | (2014.01) |
| G06F 3/0338 | (2013.01) |
| A63F 13/426 | (2014.01) |
| A63F 13/2145 | (2014.01) |
| A63F 13/355 | (2014.01) |

(52) U.S. Cl.
CPC .......... *A63F 13/42* (2014.09); *A63F 13/2145* (2014.09); *A63F 13/426* (2014.09);
(Continued)

(58) Field of Classification Search
CPC ....................................... A63F 13/42
See application file for complete search history.

(56) References Cited

U.S. PATENT DOCUMENTS 8,159,414 B2 * 4/2012 Pate ............... G06F 3/1423
341/22
9,077,991 B2 * 7/2015 Perlman ................ A63F 13/77
(Continued)

*Primary Examiner* — Duane N Taylor, Jr.
(74) *Attorney, Agent, or Firm* — Martine Penilla Group, LLP

(57) ABSTRACT

A system, method, and graphical user interface for playing games and/or executing applications on a tablet-based client. One embodiment of a graphical user interface (GUI) for playing a video game on a tablet-based client device comprises: a virtual controller rendered on a display of the tablet computer, the virtual controller substantially mimicking the control provided by a thumb stick of a physical game controller and providing omnidirectional, free-form movement in a synchronous direction in which a user moves a finger on the display of the tablet-based client.

20 Claims, 18 Drawing Sheets

Related U.S. Application Data

(60) Provisional application No. 61/610,278, filed on Mar. 13, 2012.

(52) U.S. Cl.
CPC .......... G06F 3/0338 (2013.01); *A63F 13/355* (2014.09); *A63F 2300/1068* (2013.01); *A63F 2300/308* (2013.01); *A63F 2300/6045* (2013.01)

(56) References Cited

U.S. PATENT DOCUMENTS

| | | | | |
|---|---|---|---|---|
| 2005/0012714 A1* | 1/2005 | Russo | ................ | G06F 3/033 345/157 |
| 2009/0085724 A1* | 4/2009 | Naressi | ................ | G06F 21/10 340/10.6 |
| 2010/0149127 A1* | 6/2010 | Fisher | ................ | G06F 3/0362 345/174 |
| 2010/0275163 A1* | 10/2010 | Gillespie | ................ | G06F 3/0481 715/810 |
| 2011/0199325 A1* | 8/2011 | Payne | ................ | G06F 3/0338 345/173 |
| 2011/0221692 A1* | 9/2011 | Seydoux | ................ | A63H 27/12 345/173 |
| 2011/0285636 A1* | 11/2011 | Howard | ................ | G06F 3/04815 345/173 |
| 2012/0169610 A1* | 7/2012 | Berkes | ................ | G06F 3/04883 345/173 |
| 2012/0242590 A1* | 9/2012 | Baccichet | ................ | G06F 3/0488 345/173 |

\* cited by examiner

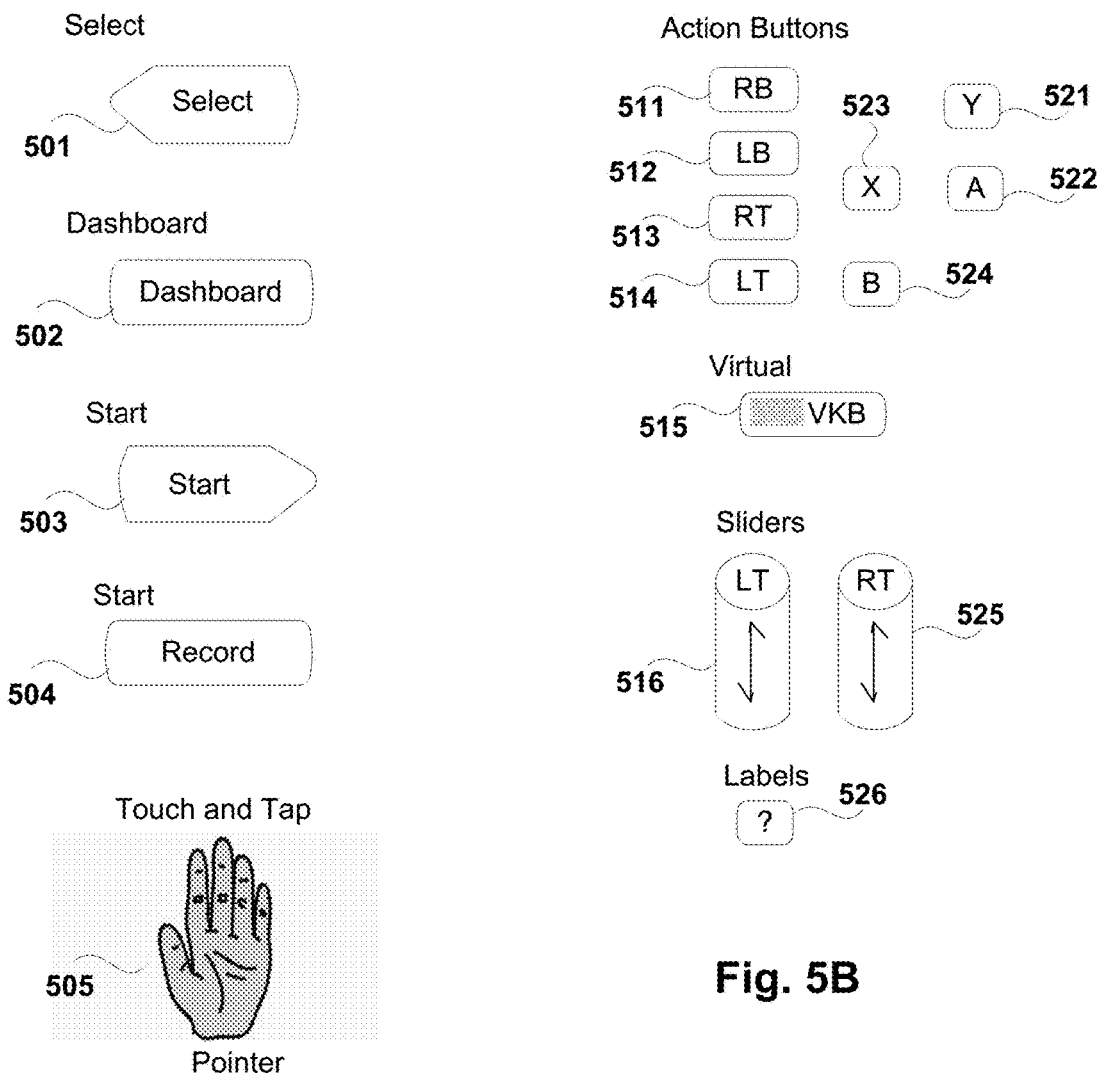

SYSTEM, METHOD, AND GRAPHICAL USER INTERFACE FOR CONTROLLING AN APPLICATION ON A TABLET

CLAIM OF PRIORITY

This application is a continuation of U.S. patent application Ser. No. 13/797,039, filed on Mar. 12, 2013, and entitled, "System, Method, and Graphical User Interface for Controlling an Application on a Tablet," which claims priority from U.S. Provisional Patent Application No. 61/610,278, filed on Mar. 13, 2012, and entitled, "System, Method, and Graphical User Interface for Controlling an Application on a Tablet," each of which is incorporated herein by reference in its entirety.

CROSS REFERENCE TO RELATED APPLICATION

This application is related to U.S. patent application Ser. No. 12/538,077, filed Aug. 7, 2009, and entitled, "SYSTEM AND METHOD FOR ACCELERATED MACHINE SWITCHING," which claims priority to U.S. Provisional Application Ser. No. 61/210,888, filed Mar. 23, 2009, and is a Continuation-in-Part (CIP) application of U.S. patent application Ser. No. 12/359,150, filed Jan. 23, 2009 (since issued as U.S. Pat. No. 9,084,936), and is a Continuation of U.S. patent application Ser. No. 11/999,475, filed Dec. 5, 2007 (since issued as U.S. Pat. No. 9,108,107), and is a Continuation-in-Part (CIP) of application Ser. No. 10/315,460, filed Dec. 10, 2002 (since issued as U.S. Pat. No. 7,849,491), entitled, "APPARATUS AND METHOD FOR WIRELESS VIDEO GAMING," each of which is incorporated herein by reference in its entirety.

TECHNICAL FIELD

The present disclosure relates generally to the field of data processing systems and particularly to an improved system, method, and graphical user interface for entering text with a physical or virtual game controller.

BACKGROUND

The assignee of the present application has developed an online application streaming service described in the co-pending applications referenced above. In operation, the application streaming service executes applications such as video games in response to control signals transmitted over the Internet from client devices. The resulting video generated by an application is compressed and streamed to the client devices, then decompressed and rendered on the client devices at low latency, such that the user of the application has the perception that the controlled application is responding instantly.

The popularity of tablet-based client devices such as the Apple iPad™, Samsung Galaxy,™ and HTC Puccini™ continues to grow. However, because user input is restricted to the graphical display of these devices, tablets pose unique challenges, particularly when used for twitch latency video games and other fast-action applications. The embodiments of the invention described below address these challenges. While these embodiments will be described within the context of an online streaming service (such as described in the co-pending applications), it will be appreciated that the underlying principles of the invention are not limited to use with an online streaming configuration.

In addition, entering text in a video game with a game controller is currently a cumbersome task. In a typical scenario, a user must navigate through a flat matrix of alphanumeric characters and select each letter individually. Embodiments of the invention described below provide improved techniques for entering text using a virtual or physical game controller.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

FIGS. 5A-B illustrate a variety of different graphical elements for use on a tablet in accordance with one embodiment of the invention.

DESCRIPTION OF EXAMPLE EMBODIMENTS

In the following description specific details are set forth, such as device types, system configurations, communication methods, etc., in order to provide a thorough understanding of the present disclosure. However, persons having ordinary skill in the relevant arts will appreciate that these specific details may not be needed to practice the embodiments described.

The assignee of the present application has developed an online video gaming and application hosting system. Certain embodiments of this system are described, for example, in U.S. patent application Ser. No. 12/538,077, filed Aug. 7, 2009, entitled SYSTEM AND METHOD FOR ACCELERATED MACHINE SWITCHING (hereinafter '077 application) which claims priority to U.S. Provisional Application Ser. No. 61/210,888, filed, Mar. 23, 2009, and is a continuation-in-part (CIP) application of Ser. No. 10/315,460 filed Dec. 10, 2002 entitled, "APPARATUS AND METHOD FOR WIRELESS VIDEO GAMING", which is assigned to the assignee of the present CIP application. These applications are sometimes referred to as the "co-pending applications" and are incorporated herein by reference. A brief description of certain pertinent aspects of the online video game and application hosting system described in the co-pending applications will now be provided, following by a detailed description of a virtualization and encryption system and method for hosting applications.

An Exemplary Online Video Game and Application Hosting System

Figure 1A:
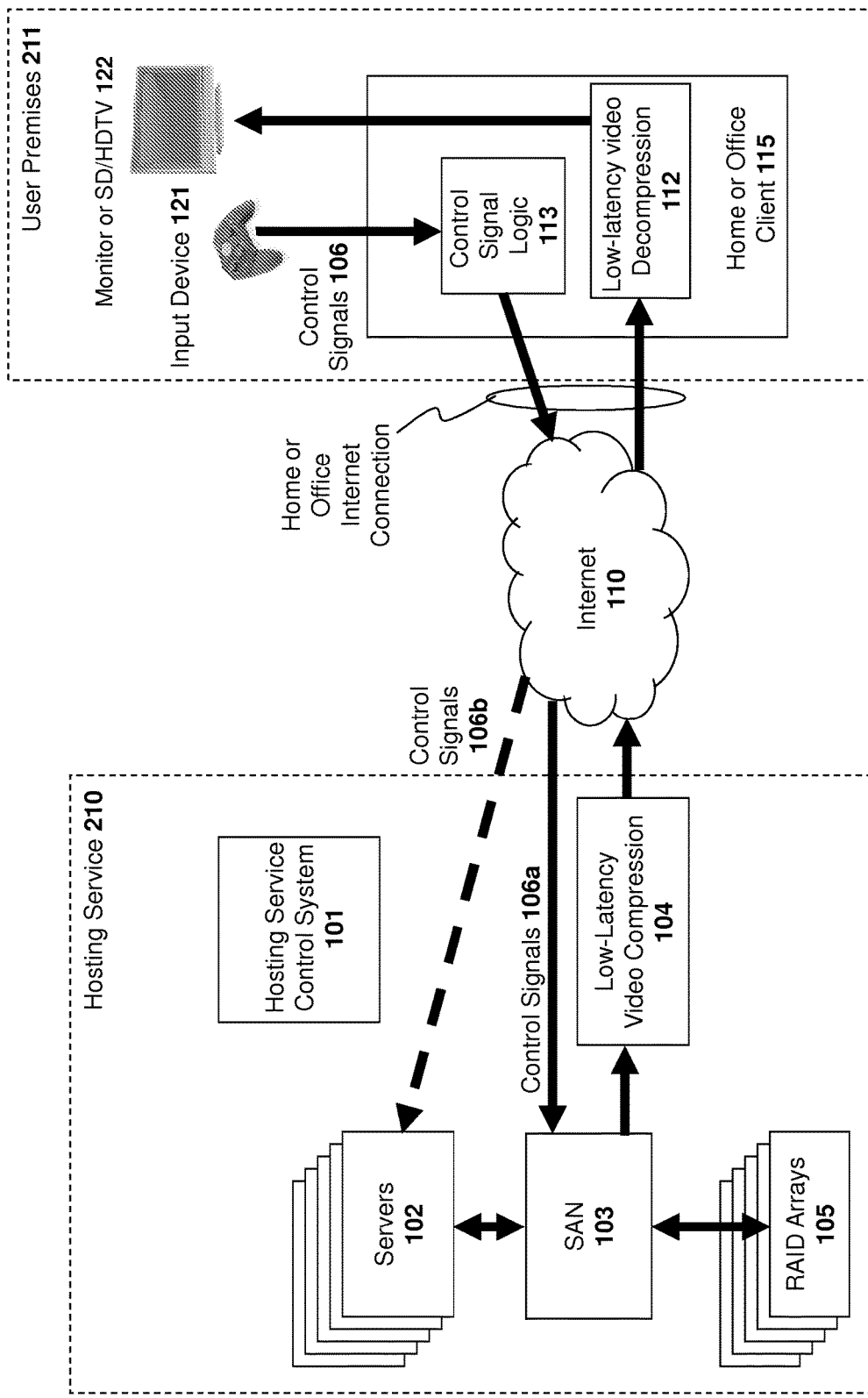
FIGS. 1A-B illustrate a system architecture for executing online video games according to one embodiment of the invention.

FIG. 1A illustrates one embodiment of a video game/application hosting service 110 described in the co-pending applications. The Hosting Service 210 hosts applications running on Servers 102, that accept input from an Input device 121, received by Home or Office Client 115, and sent through the Internet 110 to Hosting Service 210. The Servers 102 are responsive to the input, and update their video and audio output accordingly which is compressed through Low-Latency Video Compression 104. The compressed video is then streamed through the Internet 110 to be decompressed by the Home or Office Client 115, and then displayed on Monitor or SD/HDTV 122. This system is an low-latency streaming interactive video system as more thoroughly described in the aforementioned "co-pending applications."

Figure 1B:
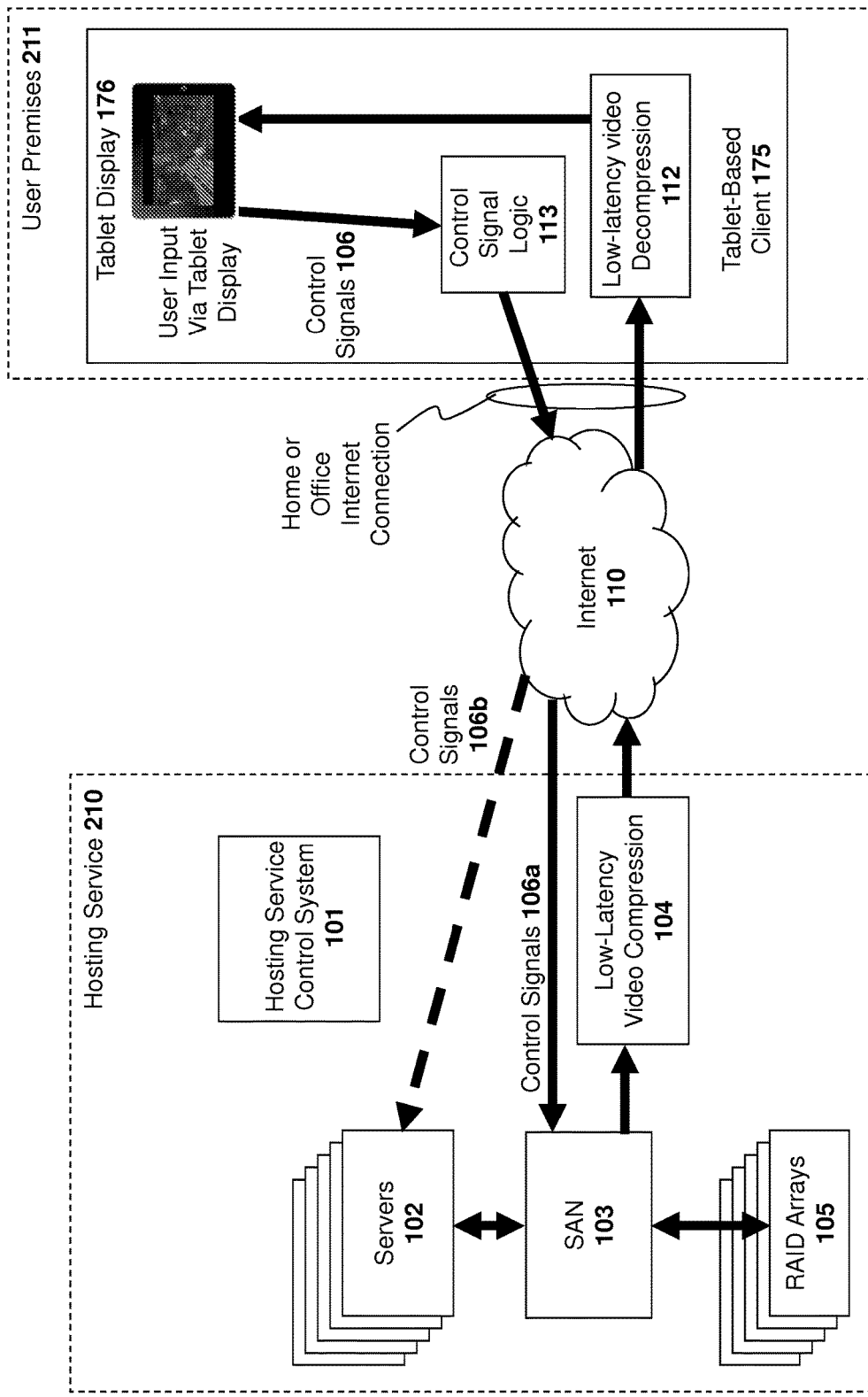

FIG. 1B illustrates one embodiment of the invention in which the client is a tablet-based client 175 such as an Apple iPad™, Samsung Galaxy,™ or HTC Puccini™. Control signals are 106 are generated in response to the user manipulating graphical control elements on the display of the tablet (several embodiments of which are described below). The hosting service 210 executes an application such as a video game in response to the control signals 106 and generates video of the application. The low-latency video compression module 104 then compresses the video and streams the compressed video to the tablet-based client 175. The low latency video decompression module 112 on the client decompresses and renders the video on the tablet display 176. It should be noted that, while the term "tablet" is used herein for the sake of brevity, "tablet" is intended to be inclusive of devices of all sizes and categories that are capable of implementing the functionality described herein, such as Apple iOS devices inclusive of iPhone and iPod, Android devices inclusive of smartphones, and computers or displays, all of the preceding with or without buttons or controls, whether controls (inclusive of touch and motion-sensing controls) are built-in, physically attached, or wirelessly attached to the device.

Figure 2:
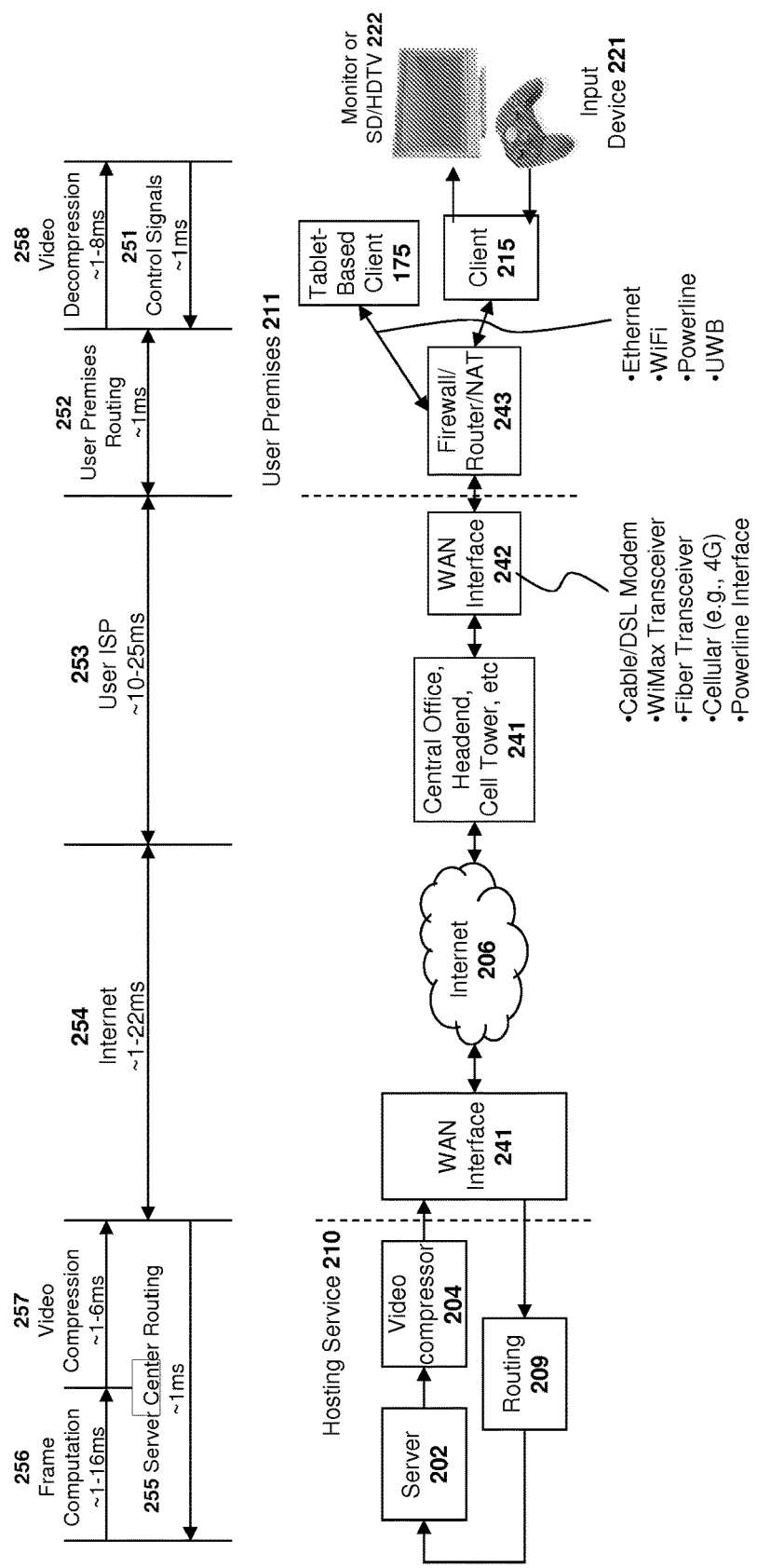
FIG. 2 illustrates different communication channels over which an online video game may be played in accordance with one embodiment of the invention.

As shown in FIG. 2, the network connection between the Hosting Service 210 Home and Office Client 215 or tablet-based client 175 may be implemented through a wide range of network technologies, of varying degrees of reliability, such as wired or optical fiber technologies that are typically more reliable and wireless technologies that may be subject to unpredictable interference or range limitations (e.g. Wi-Fi) and are typically less reliable. Any of these client devices may have their own user input devices (e.g., keyboards, buttons, touch screens, track pads or inertial-sensing wands, video capture cameras and/or motion-tracking cameras, etc.), or they may use external input devices 221 (e.g., keyboards, mice, game controllers, inertial sensing wand, video capture cameras and/or motion tracking cameras, etc.), connected with wires or wirelessly. As described in greater detail below, the hosting service 210 includes servers of various levels of performance, including those with high-powered CPU/GPU processing capabilities. During playing of a game or use of an application on the hosting service 210, a home or office client device 215 receives keyboard and/or controller input from the user. A tablet-based client 175 receives input as the user manipulates graphical control elements on the tablet display or moves the tablet so as to effect built-in motion sensors (in addition to what is shown in FIG. 2, tablets may also receive input from (but not limited to) other built-in controls, such as keyboard, mouse, buttons, wheels, trackpads, joysticks, audio or video input, motion capture, etc., as well as external controls, such a wired or wireless-connected gamepad, keyboard, mouse, trackpad, audio or video input, motion/position capture/sensing, etc.). In either case, the clients 215, 175 transmit the control input (also called herein the "controller input") through the Internet 206 to the hosting service 210 that executes the gaming program code in response and generates successive frames of video output (a sequence of video images) for the game or application software (e.g., if the user presses a button which would direct a character on the screen to move to the right, the game program would then create a sequence of video images showing the character moving to the right). This sequence of video images is then compressed using a low-latency video compressor, and the hosting service 210 then transmits the low-latency video stream through the Internet 206. The home or office client device then decodes the compressed video stream and renders the decompressed video images on a monitor or TV. Consequently, the computing and graphical hardware requirements of the client devices 215, 175 are significantly reduced. The client 215 only needs to have the processing power to forward the keyboard/controller input to the Internet 206 and decode and decompress a compressed video stream received from the Internet 206, which virtually any personal computer is capable of doing today in software on its CPU (e.g., a Intel Corporation Core Duo CPU running at approximately 2 GHz is capable of decompressing 720p HDTV encoded using compressors such as H.264 and Windows Media VC9). And, in the case of any client devices 215, 175, dedicated chips can also perform video decompression for such standards in real-time at far lower cost and with far less power consumption than a general-purpose CPU such as would be required for a modern PC. Notably, to perform the function of forwarding controller input and decompressing video, client devices 215, 175 typically do not require any specialized graphics processing units (GPUs), optical drive or hard drives.

As games and applications software become more complex and more photo-realistic, they will require higher-performance CPUs, GPUs, more RAM, and larger and faster disk drives, and the computing power at the hosting service 210 may be continually upgraded, but the end user will not be required to update the home or office client platform 215 or tablet-based client 175 since its processing requirements will remain constant for a display resolution and frame rate with a given video decompression algorithm. Thus, the hardware limitations and compatibility issues seen today do not exist in the system illustrated in FIG. 2.

Further, because the game and application software executes only in servers in the hosting service 210, there never is a copy of the game or application software (either in the form of optical media, or as downloaded software) in the user's home or office ("office" as used herein unless otherwise qualified shall include any non-residential setting, including, schoolrooms, for example). This significantly mitigates the likelihood of a game or application software being illegally copied (pirated), as well as mitigating the likelihood of a valuable database that might be used by a game or applications software being pirated. Indeed, if specialized servers are required (e.g., requiring very expensive, large or noisy equipment) to play the game or application software that are not practical for home or office use, then even if a pirated copy of the game or application software were obtained, it would not be operable in the home or office.

Figure 3:
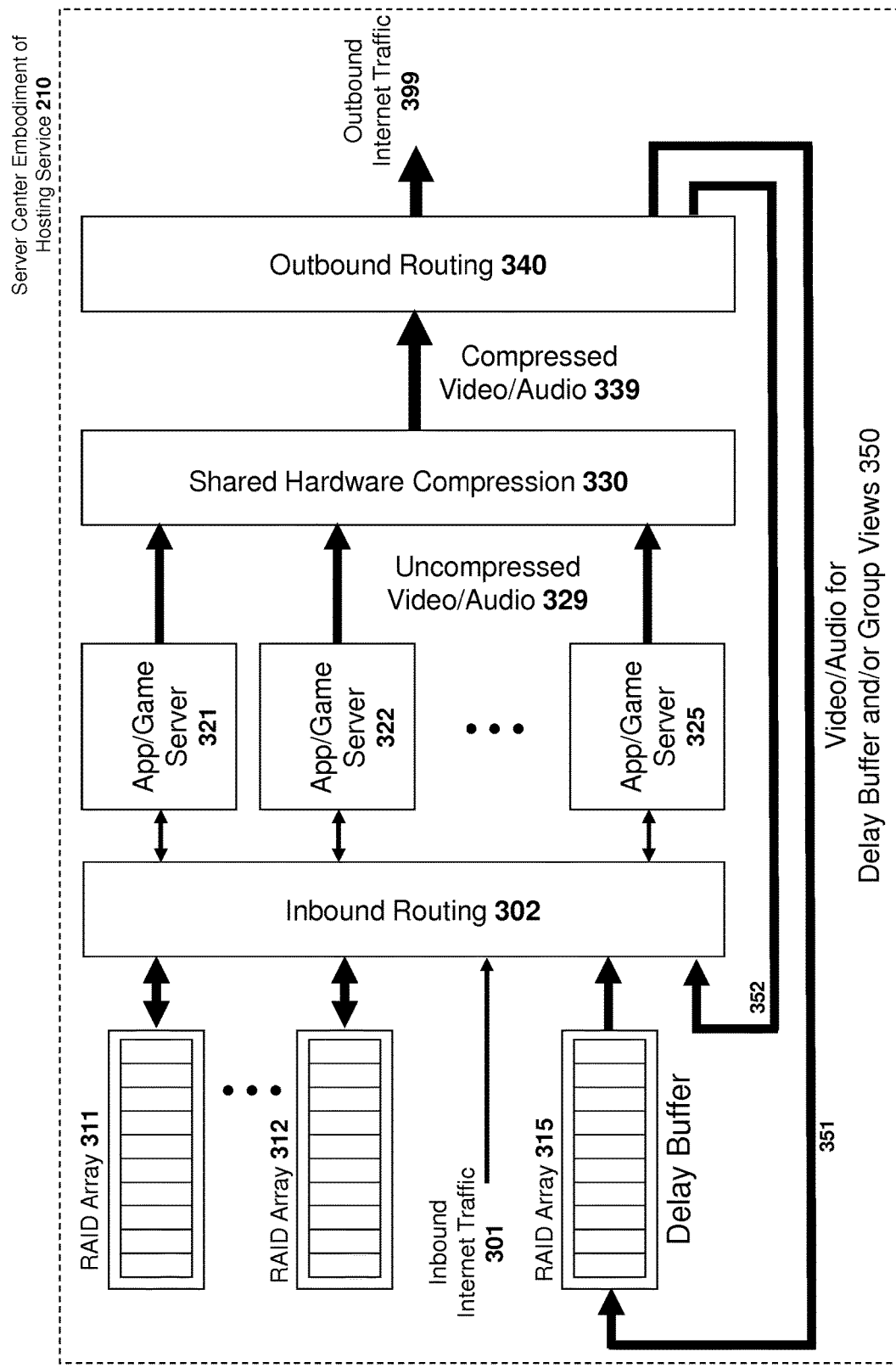
FIG. 3 illustrates one embodiment of a system architecture for compressing audio/video generated by a video game.

FIG. 3 illustrates an embodiment of components of a server center for hosting service 210 utilized in the following feature descriptions. Inbound internet traffic 301 from user clients such as the tablet-based client 175 mentioned above is directed to inbound routing 301. Typically, inbound internet traffic 301 will enter the server center via a high-speed fiber optic connection to the Internet, but any network connection means of adequate bandwidth, reliability and low latency will suffice. Inbound routing 302 is a system of network (the network can be implemented as an Ethernet network, a fiber channel network, or through any other transport means) switches and routing servers supporting the switches which takes the arriving packets and routes each packet to the appropriate application/game ("app/game") server 321-325.

In one embodiment, a packet which is delivered to a particular app/game server represents a subset of the data received from the client and/or may be translated/changed by other components (e.g., networking components such as gateways and routers) within the data center. In some cases, packets will be routed to more than one server 321-325 at a time, for example, if a game or application is running on multiple servers at once in parallel. RAID arrays 311-312 are connected to the inbound routing network 302, such that the app/game servers 321-325 can read and write to the RAID arrays 311-312. Further, a RAID array 315 (which may be implemented as multiple RAID arrays) is also connected to the inbound routing 302 and data from RAID array 315 can be read from app/game servers 321-325. The inbound routing 302 may be implemented in a wide range of prior art network architectures, including a tree structure of switches, with the inbound internet traffic 301 at its root; in a mesh structure interconnecting all of the various devices; or as an interconnected series of subnets, with concentrated traffic amongst intercommunicating device segregated from concentrated traffic amongst other devices. One type of network configuration is a SAN which, although typically used for storage devices, it can also be used for general high-speed data transfer among devices. Also, the app/game servers 321-325 may each have multiple network connections to the inbound routing 302. For example, a server 321-325 may have a network connection to a subnet attached to RAID Arrays 311-312 and another network connection to a subnet attached to other devices. While the shared hardware compression 330 is an exemplary embodiment to compress the video output of the app/game Servers 321-325 may have completely independent or partially independent video compression capability that may be implemented in dedicated hardware or in software or in some combination thereof, and the video may be compressed by one or a plurality of compression means using one or more compression algorithms, in either unidirectional or bi-directional form, adaptively or non-adaptively, etc. The descriptions herein that reference shared hardware compression 330 also may be applied, as appropriate, to the above referenced compression embodiments.

The app/game servers 321-325 may all be configured the same, some differently, or all differently, as previously described in relation to servers 102 in the embodiment illustrated in FIGS. 1A-B. In one embodiment, each user, when using the hosting service is typically using at least one app/game server 321-325. For the sake of simplicity of explanation, we shall assume a given user is using app/game server 321, but multiple servers could be used by one user, and multiple users could share a single app/game server 321-325. The user's control input, sent from a client such as a tablet-based client 175 mentioned above is received as inbound Internet traffic 301, and is routed through inbound routing 302 to app/game server 321. App/game server 321 uses the user's control input as control input to the game or application running on the server, and computes the next frame of video and the audio associated with it. App/game server 321 then outputs the uncompressed video/audio 329 to shared video compression 330. App/game server may output the uncompressed video via any means, including one or more Gigabit Ethernet connections, but in one embodiment the video is output via a DVI connection and the audio and other compression and communication channel state information is output via a Universal Serial Bus (USB) connection.

The shared video compression 330 compresses the uncompressed video and audio from the app/game servers 321-325. The compression maybe implemented entirely in hardware, or in hardware running software. There may a dedicated compressor for each app/game server 321-325, or if the compressors are fast enough, a given compressor can be used to compress the video/audio from more than one app/game server 321-325. For example, at 60 fps a video frame time is 16.67 ms. If a compressor is able to compress a frame in 1 ms, then that compressor could be used to compress the video/audio from as many as 16 app/game servers 321-325 by taking input from one server after another, with the compressor saving the state of each video/audio compression process and switching context as it cycles amongst the video/audio streams from the servers. This results in substantial cost savings in compression hardware. Since different servers will be completing frames at different times, in one embodiment, the compressor resources are in a shared pool 330 with shared storage means (e.g., RAM, Flash) for storing the state of each compression process, and when a server 321-325 frame is complete and ready to be compressed, a control means determines which compression resource is available at that time, provides the compression resource with the state of the server's compression process and the frame of uncompressed video/audio to compress.

Note that part of the state for each server's compression process may include information about the compression itself, such as the previous frame's decompressed frame buffer data which may be used as a reference for P tiles, the resolution of the video output; the quality of the compression; the tiling structure; the allocation of bits per tiles; the compression quality, the audio format (e.g., stereo, surround sound, Dolby® AC-3). But the compression process state may also include communication channel state information regarding the peak data rate and whether a previous frame is currently being output (and as result the current frame should be ignored), and potentially whether there are channel characteristics which should be considered in the compression, such as excessive packet loss, which affect decisions for the compression (e.g., in terms of the frequency of I tiles, etc). As the peak data rate or other channel characteristics change over time, as determined by an app/game server 321-325 supporting each user monitoring data sent from the tablet-based client 175 (or other type of client), the app/game server 321-325 may send the relevant information to the shared hardware compression 330.

The shared hardware compression 330 may also packetize the compressed video/audio using means such as those previously described, and if appropriate, applying FEC codes, duplicating certain data, or taking other steps to as to adequately ensure the ability of the video/audio data stream to be received by the tablet-based client 175 (or other type of client) and decompressed with as high a quality and reliability as feasible.

Some applications, such as those described below, require the video/audio output of a given app/game server 321-325 to be available at multiple resolutions (or in other multiple formats) simultaneously. If the app/game server 321-325 so notifies the shared hardware compression 330 resource, then the uncompressed video/audio 329 of that app/game server 321-325 will be simultaneously compressed in different formats, different resolutions, and/or in different packet/error correction structures. In some cases, some compression resources can be shared amongst multiple compression processes compressing the same video/audio (e.g., in many compression algorithms, there is a step whereby the image is scaled to multiple sizes before applying compression. If different size images are required to be output, then this step can be used to serve several compression processes at once). In other cases, separate compression resources will be required for each format. In any case, the compressed video/audio 339 of all of the various resolutions and formats required for a given app/game server 321-325 (be it one or many) will be output at once to outbound routing 340. In one embodiment the output of the compressed video/audio 339 is in UDP format, so it is a unidirectional stream of packets.

The outbound routing network 340 comprises a series of routing servers and switches which direct each compressed video/audio stream to the intended user(s) or other destinations through outbound Internet traffic 399 interface (which typically would connect to a fiber interface to the Internet) and/or back to the delay buffer 315 (implemented as a RAID array in one embodiment), and/or back to the inbound routing 302, and/or out through a private network (not shown) for video distribution. Note that (as described below) the outbound routing 340 may output a given video/audio stream to multiple destinations at once. In one embodiment, this is implemented using Internet Protocol (IP) multicast in which a given UDP stream intended to be streamed to multiple destinations at once is broadcasted, and the broadcast is repeated by the routing servers and switches in the outbound routing 340. The multiple destinations of the broadcast may be to multiple users' clients 175 via the Internet, to multiple app/game servers 321-325 via inbound routing 302, and/or to one or more delay buffers 315. Thus, the output of a given server 321-322 is compressed into one or multiple formats, and each compressed stream is directed to one or multiple destinations.

Further, in another embodiment, if multiple app/game servers 321-325 are used simultaneously by one user (e.g., in a parallel processing configuration to create the 3D output of a complex scene) and each server is producing part of the resulting image, the video output of multiple servers 321-325 can be combined by the shared hardware compression 330 into a combined frame, and from that point forward it is handled as described above as if it came from a single app/game server 321-325.

Note that in one embodiment, a copy (in at least the resolution or higher of video viewed by the user) of all video generated by app/game servers 321-325 is recorded in delay buffer 315 for at least some period of time (15 minutes in one embodiment). This allows each user to "rewind" the video from each session in order to review previous work or exploits (in the case of a game). Thus, in one embodiment, each compressed video/audio output 339 stream being routed to a client 175 is also being multicasted (in another embodiment, a separate unicast transmissions is used) to a delay buffer 315. When the video/audio is stored on a delay buffer 315, a directory on the delay buffer 315 provides a cross reference between the network address of the app/game server 321-325 that is the source of the delayed video/audio and the location on the delay buffer 315 where the delayed video/audio can be found.

App/game servers 321-325 may not only be used for running a given application or video game for a user, but they may also be used for creating the user interface applications for the hosting service 210 that supports navigation through hosting service 210 and other features.

Figure 10B:
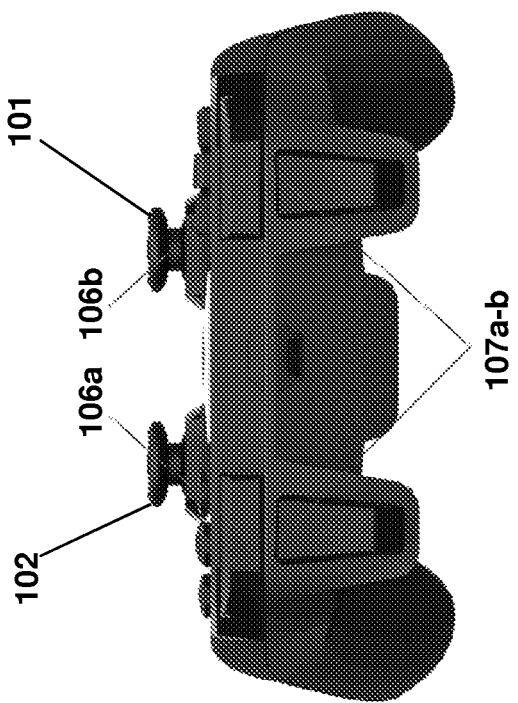
FIGS. 10A-10B illustrate physical elements of a game controller that correspond to graphical user interface elements for a tablet provided in a configuration of a virtual controller.
Figure 10A:
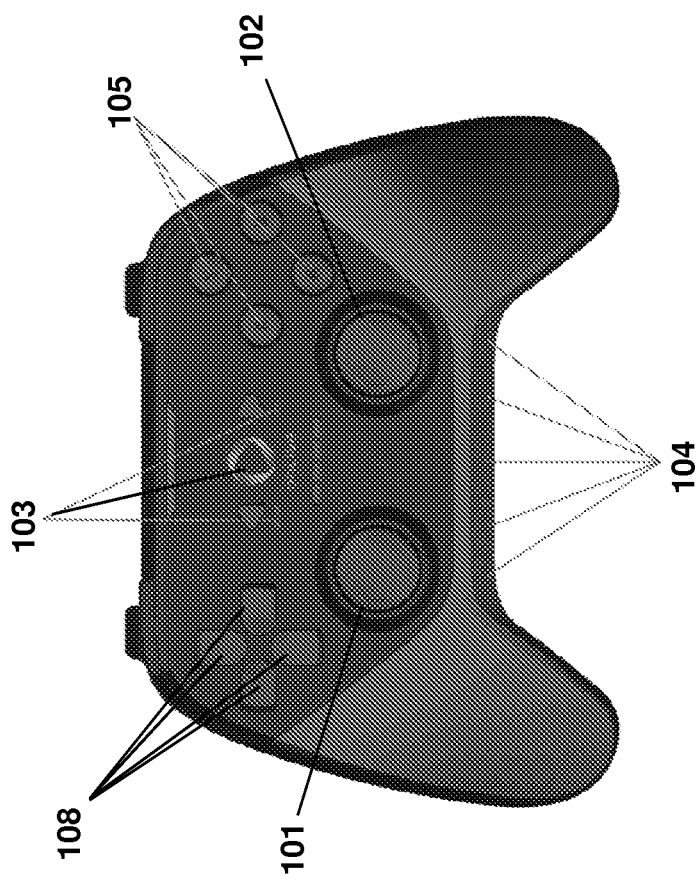

System, Method, and Graphical User Interface for Controlling an Application on a Tablet As mentioned above, in one embodiment of the invention, a tablet-based client 175 is used which includes a set of graphical user interface elements to allow the user to navigate and control the operation of an online application such as a video game. In one embodiment, the set of graphical user input elements include elements which correspond to common buttons, knobs and joysticks on a game controller, one example of which is illustrated in FIGS. 10A-B. Specifically, the physical controller includes left and right joysticks 101 and 102, respectively, which may be freely moved in all directions to perform game input functions. For example, in an adventure game or first person shooter, the joysticks may be manipulated to move a character throughout the game. Also shown in FIGS. 10A-B is a directional pad (commonly referred to as a D-pad) 108 to perform up, down, left, and right motion and/or cursor controls. A group of four action buttons 105 are provided to perform various application-specific functions (e.g., jump, run, switch weapons, etc). A set of transport buttons 104 positioned towards the bottom of the controller allow the user to perform play/pause, stop, fast forward, and rewind operations from within a game (e.g., to pause, fast forward, rewind, etc, within the game). A set of three navigation buttons 103 provided towards the middle of the controller may provide various different navigation functions and/or other system-specific functions. For example, in one embodiment, the central circular button causes a user navigation interface to appear overlaid on top of the current game; the left button is used to back out of menu items; and the right button is used to enter/select menu items. Of course, the underlying principles of the invention are not limited to any particular set of button functions. Bumper buttons 106a-b (sometimes referred to as shoulder buttons) and trigger buttons 107a-b provide various well-known game specific functions (e.g., fire, change weapon, reload, etc).

Figure 4A:
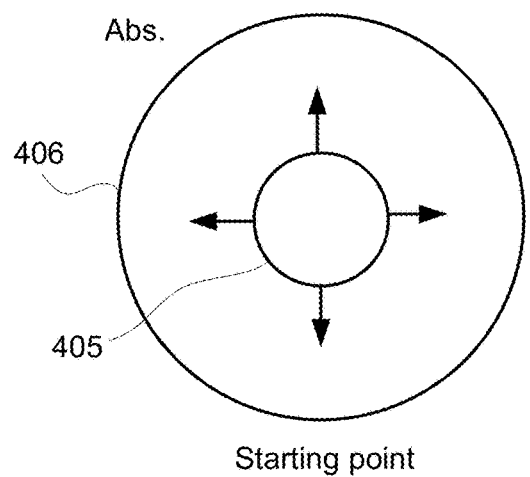
FIGS. 4A-B illustrate a graphical element for a virtual thumb stick according to one embodiment of the invention.
Figure 4B:
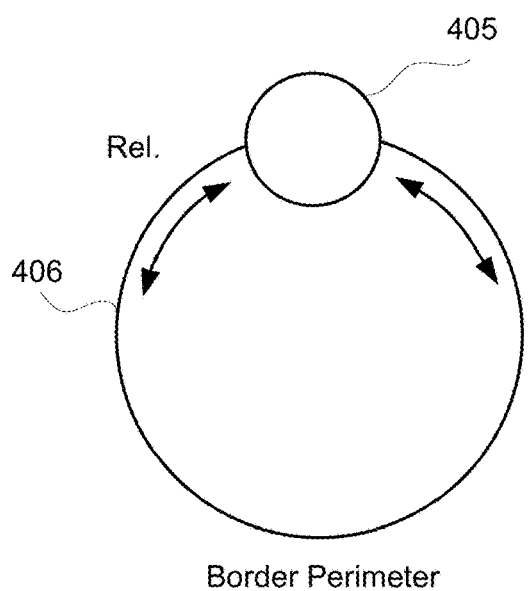
Figure 6:
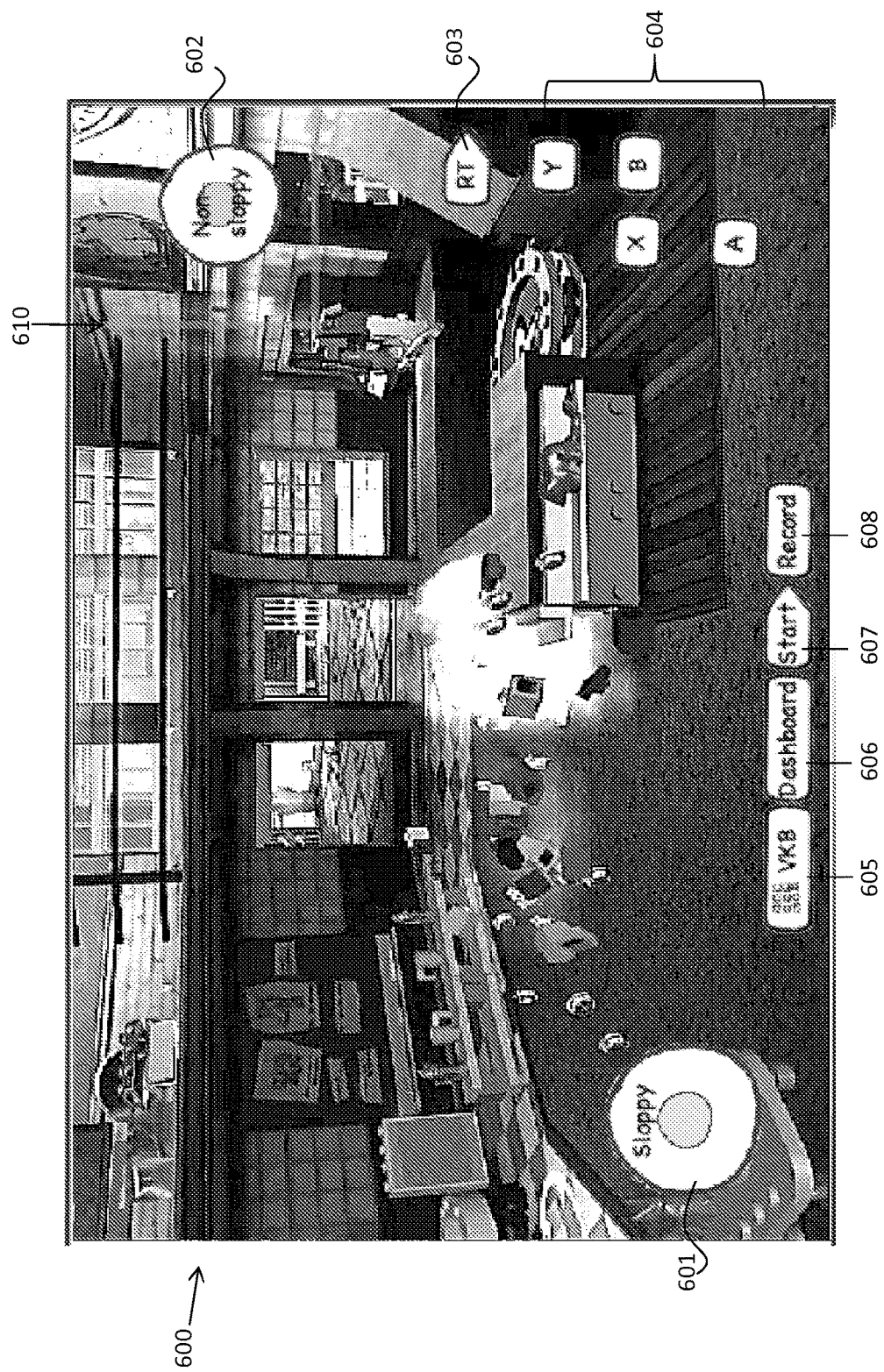
FIGS. 6-9 illustrate the graphical elements from FIGS. 4A-B and FIGS. 5A-B in several different configurations for different games rendered on a tablet.

An exemplary set of graphical user interface elements which provide touch-screen functionality on a tablet-based computer is illustrated in FIGS. 4A-B and FIGS. 5A-B, and exemplary arrangements for these graphical user interface elements in a series of video games is illustrated in FIGS. 6-9. Turning first to FIGS. 4A-B, one embodiment of a virtual controller 405 is shown which is manipulated by a user's thumbs (or other fingers) on the surface of the tablet-based client (i.e., in a similar manner as the left and right joysticks 101 and 102, respectively, are manipulated on the physical controller). In one embodiment, the inner circle 405 is the controller which, in one embodiment, provides omnidirectional, free form movement (i.e., not limited to circular or XY movement). The outer circle 406 identifies the border perimeter, i.e., the maximum distance that the controller 405 may be moved from its starting position (as shown in FIG. 4B).

In one embodiment, a user's finger is not limited to the space defined by the border perimeter 406. Rather, the user may move a finger outside of this region. In one embodiment, when a user's finger is moved outside of the border perimeter, the virtual controller 405 travels on the border 406 (as shown in FIG. 4B). While the user may move a finger outside of the region defined by the border perimeter, the user may only move a finger within a defined region for each virtual (sometimes referred to herein as a "hit box") controller, such as an upper right or lower left quadrant as indicated by arrows 610, 710-711, 810, and 910-911 in FIGS. 6-9.

In one embodiment, different modes of operation may be specified for the virtual controller 405 including a "relative mode" (also referred to herein as "sloppy thumbsticks") and an "absolute mode." In one embodiment, when in relative mode, the virtual controller 405 is initially drawn at the point the user places a thumb (or other finger) on the tablet display. The movement of an in-game object using the virtual controller then relates to the movement of finger relative to this initial touch point. In one embodiment, if the user lifts and then places his/her thumb back on a new position on the display, the first virtual controller 601 will be redrawn at the new position. In contrast, when in absolute mode, the virtual controller is drawn in a fixed location on the display and is moved based on a user's finger position on screen (as described above). One embodiment of the invention allows the user to select between the relative and absolute modes described above.

In one embodiment, the size of the virtual controller and the defined region in which the virtual controller can be manipulated by the user (the "hit box") is set automatically, based on the dimensions of the tablet computer's display. The number and diameter of each virtual controller may be configured per game. For example, in FIG. 6, a relatively larger virtual controller 601 is configured in the lower left quadrant of the display while a relatively smaller virtual controller 602 is configured in the upper right quadrant of the display.

Additionally, in one embodiment, the mode of each virtual controller may be configured on a per-game or per-user basis. For example, in FIG. 6, the first virtual controller 601 is configured as a "sloppy" or "relative mode" controller, whereas the second controller 602 is configured as a "non-sloppy" or "absolute mode" controller. Thus, during gameplay, the first virtual controller will be automatically drawn wherever the user places a thumb or other finger within the lower left quadrant. The movement of the virtual controller is then relative to this initial touch point. By contrast, the second virtual controller 602, which is operated as a "non-sloppy" or "absolute mode" controller is drawn in the same location on the display regardless of the user's initial finger positioning. Different combinations of relative/absolute mode and large/small controllers may be specified for each game (e.g., by the game designer) and/or may be configurable by the end user or the hosting service 210.

In one embodiment, the virtual controllers 405 and other graphical user interface elements are transparent or semi-transparent so that the user can see the results of the game being played beneath. The virtual controllers and other user interface elements may also be in a low dim state when not used and then may be brightened in response to a user's touch. Alternatively, or in addition, the transparency level of the controller and other user interface elements may change in response to a user's touch. In one embodiment, each of the individual user interface elements including the controller may have unique dimness or transparency settings (e.g., as specified by the user), but default to global settings.

In one embodiment, the sensitivity of each virtual controller is also configurable by the game designer, the end user, and/or the hosting service 210. For example, a first sensitivity setting may cause the virtual controller 405 to move with a different amount of acceleration in response to the movement of a user's finger on the display of the tablet.

Additional graphical user interface elements for a tablet which correspond to physical elements on a game controller (such as shown in FIGS. 10A-B) are shown in FIGS. 5A-B:

Select 501 mimics a select button on a physical game controller. This graphical button may be optional and used in different configurable ways for each game or other application.

Dashboard 502 launches a graphical navigation menu (referred to as the "dashboard") provided by the online hosting service 210. In one embodiment, the graphical navigation menu is illustrated in FIGS. 16-23 of the co-pending U.S. patent application Ser. No. 12/538,077, filed Aug. 7, 2009, entitled SYSTEM AND METHOD FOR ACCELERATED MACHINE SWITCHING, which has been incorporated herein by reference.

Start 503 provides games options menu/pause function and is used for all games streamed by the hosting service 210.

Record 504 allows a user to record gameplay for a game currently being played (referred to as "brag clips" in the co-pending applications). In one embodiment, the recordings may be stored on the hosting service 210 and played back by the user and other users.

A "touch and tap" user interface element 505 allows finger dragging and taping on the screen of the tablet. In one embodiment, the touch and tap element 505 is provided on mouse-click style games (e.g., World of Goo™ designed by 2D Boy™).

A variety of action buttons are provided which correspond to the action buttons on a typical game controller (such as that illustrated in FIGS. 10A-B). These include a right bumper 511, left bumper 512, right trigger 513, left trigger 514, and X 523, Y 521, A 522, and B 524 buttons (corresponding to the X, Y, A, and B buttons 105 on the physical controller shown in FIG. 10A). Various combinations of the action buttons and their placement may be customized for each game, by the game designer, the end user, and/or the hosting service 210. While some of these customizations are shown below with respect to FIGS. 6-9, these are merely illustrative examples which should not be read to limit the scope of the present invention.

A virtual keyboard button 515 in FIG. 5B opens a virtual keyboard on the tablet. In one embodiment, the keyboard opened is the native virtual keyboard designed for the particular tablet being used and opens automatically when text input is required.

Left slider trigger 516 and right slider trigger 525 are graphical user interface buttons which can be configured to reset to zero when the user's finger stops touching (similar to a Gamepad trigger) or can be configured to stay at a current value set when the user's finger stops touching. Additionally, these buttons may be angled vertically or horizontally.

The labels button 526 may be used to toggle between showing/hiding labels for each of the game controls. By way of example, in FIG. 8B, a plurality of labels are displayed for a tennis game (i.e., Y=Lob, B=Slice, A=Top Spin, and the virtual controller=move). In one embodiment, certain labels are not affected by the labels button (e.g., the dashboard, start, select, etc.)

Turning now to some of the specific configurations set forth in FIGS. 6-9, FIG. 6 illustrates one particular game for which a first virtual controller 601 is positioned in the lower left quadrant of the tablet's display 600 and a second virtual controller 602 is positioned in the upper right quadrant of the tablet's display 600. The first virtual controller 601 in the illustrated example is configured for a relative mode of operation (i.e., sloppy), whereas the second virtual controller 602 is configured for an absolute mode of operation ("non-sloppy"). Thus, as previously described, the first controller 601 is drawn at a position where the user places a finger whereas the second controller 602 is drawn in a fixed position on the display. A region is defined in the upper right portion of the display (as indicated by arrows 610) into which the user must place a finger in order to operate the second virtual controller 602. A similar region may also be defined with respect to the first controller 601 or, alternatively, the second controller may be operable anywhere on the left half of the display (i.e., with the second controller being drawn wherever the user places a finger from his/her left hand while holding the tablet-based client).

Towards the right side of the display is a virtual right trigger (RT) button 603 and a set of X, Y, A, B buttons 604 which have various defined functions depending on the video game being played. Towards the bottom of the display are a virtual keyboard button 605 (for entering text), a dashboard button 606 (for opening the graphical user interface of the hosting service), a start button 607 (for providing game options and menu/pause functions), and a record button 608 (for recording brag clips as described above).

Figure 7:
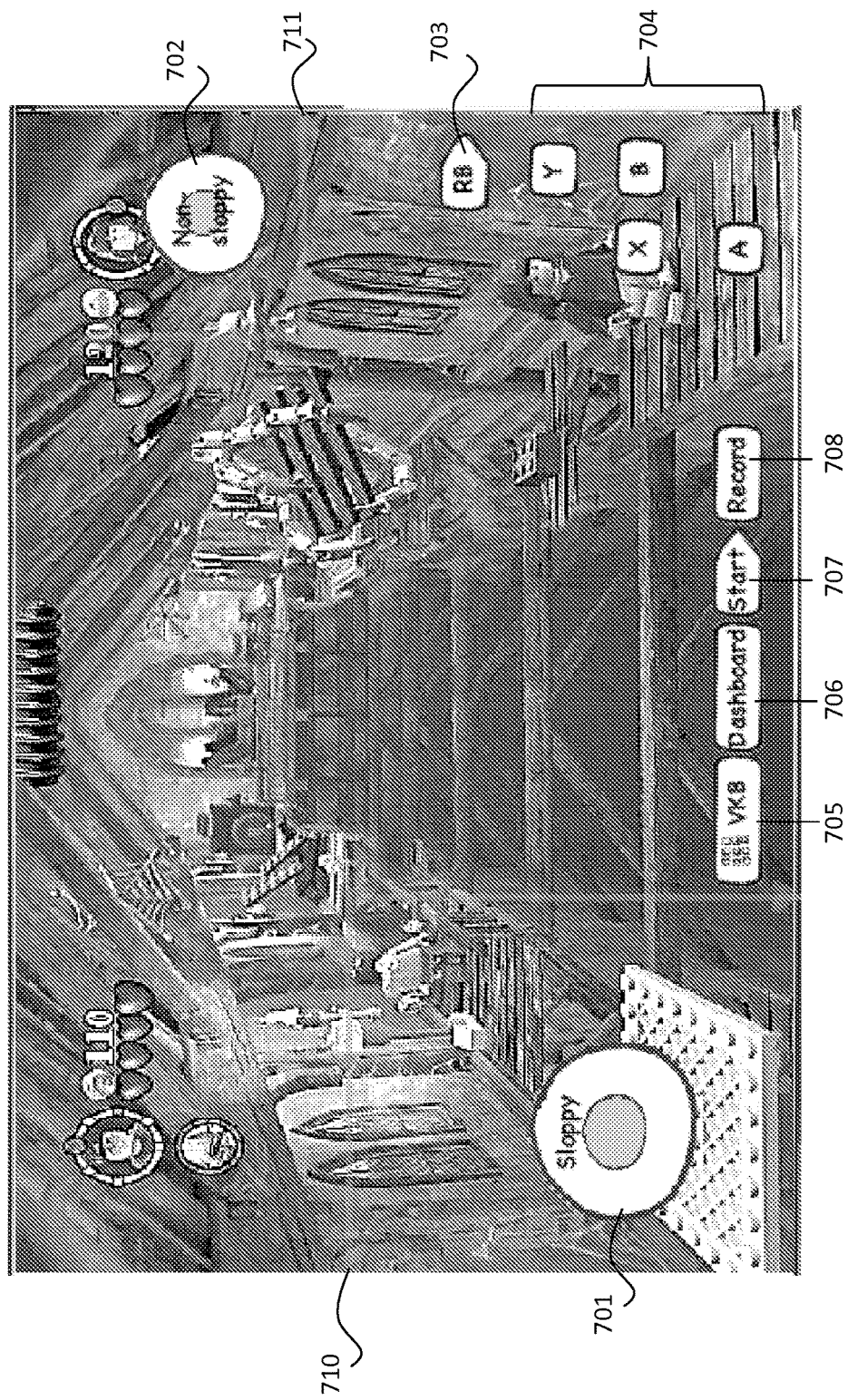

FIG. 7 illustrates another embodiment in which a first virtual controller 701 is positioned in the lower left quadrant of the tablet's display 600 and a second virtual controller 702 is positioned in the upper right quadrant of the tablet's display. As in the embodiment shown in FIG. 6, the first virtual controller 701 is configured for a relative mode of operation (i.e., sloppy), whereas the second virtual controller 702 is configured for an absolute mode of operation ("non-sloppy"). In this embodiment, regions are defined in both the lower left and upper right portions of the display (as indicated by arrows 701 and 702, respectively) into which the user must place a finger in order to operate the first virtual controller 701 and the second virtual controller 702, respectively.

Towards the right side of the display is a virtual right bumper (RB) button 703 and a set of X, Y, A, B buttons 704 which have various defined functions depending on the video game being played. Towards the bottom of the display are a virtual keyboard button 705 (for entering text), a dashboard button 706 (for opening the graphical user interface of the hosting service), a start button 707 (for providing game options and menu/pause functions), and a record button 708 (for recording brag clips as described above).

Figure 8A:
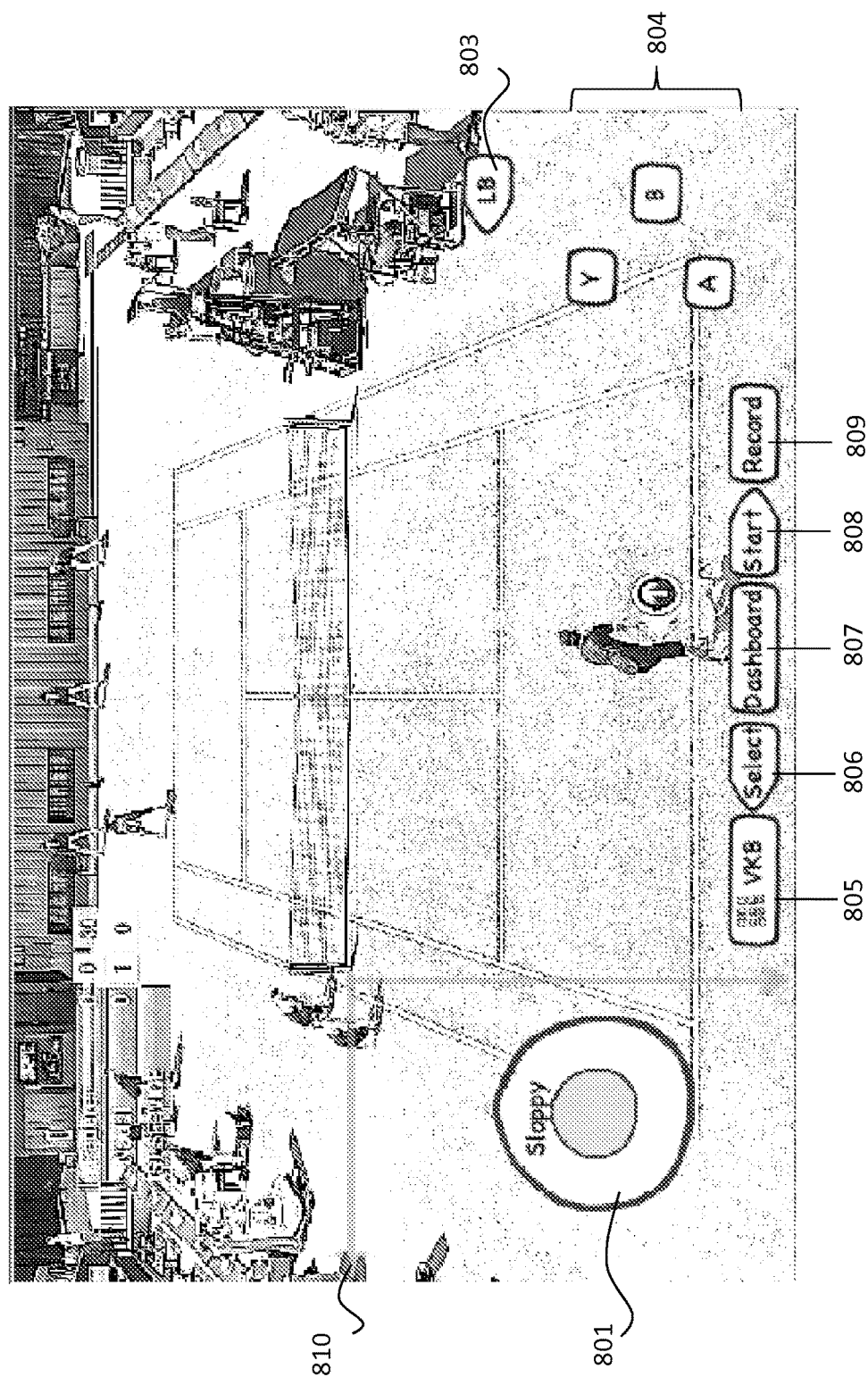
Figure 8B:
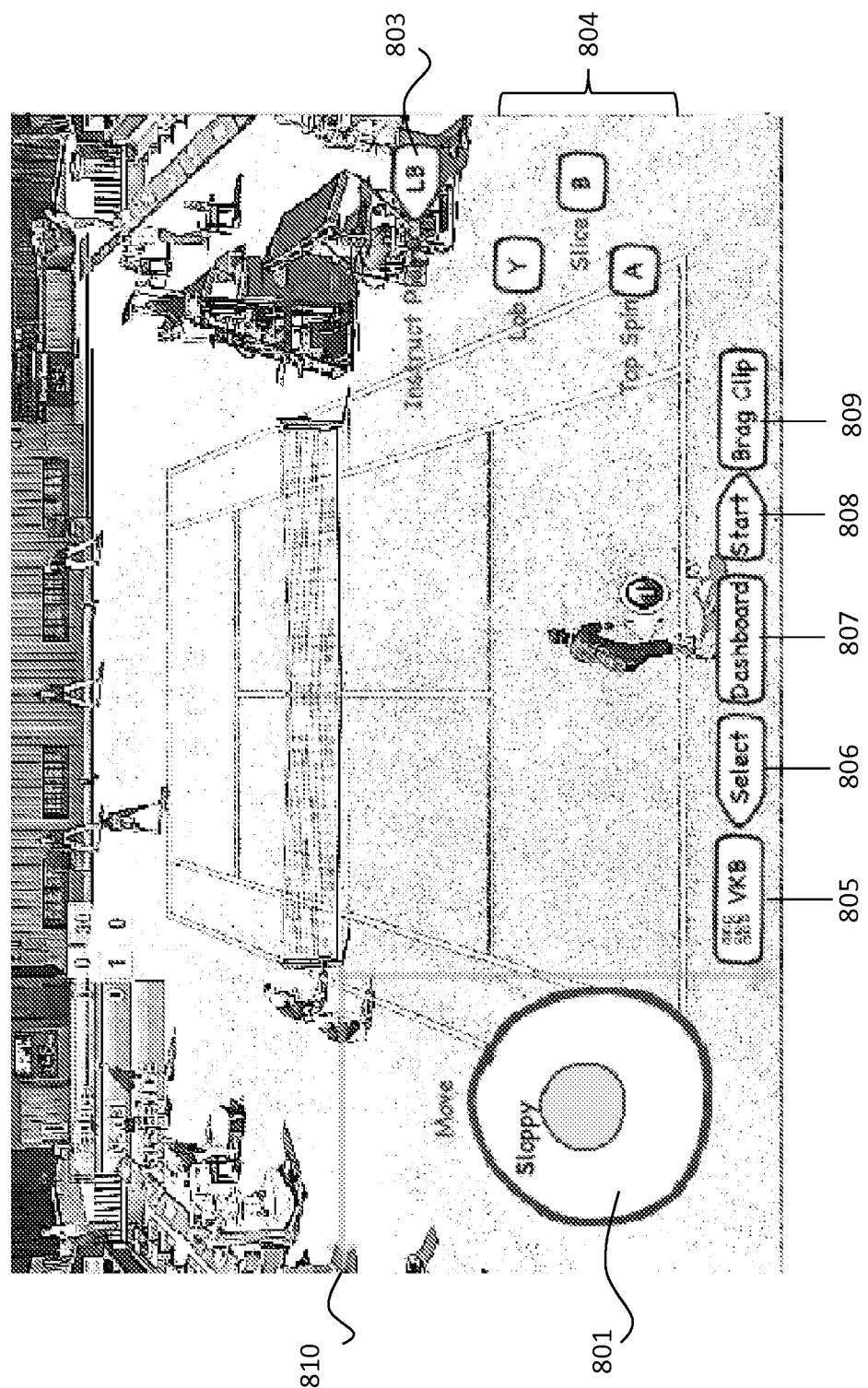

FIGS. 8A-B illustrate another embodiment in which a first virtual controller 801 configured for a relative mode of operation (i.e., sloppy) is displayed in the lower left corner of the tablet's display. This embodiment does not use a second virtual controller. As previously mentioned, the specific configuration of the virtual controllers and other input elements may be specified by the game designer, end user, and/or hosting service 210. Once again, a region is defined in the lower left corner of the display within the user must place a finger to activate the virtual controller 801 (as defined by lines 810).

Other elements shown in FIGS. 8A-B include a left bumper 803 and set of Y, A, and B control elements 804 displayed on the right side of the tablet's display (so as to be accessible by the user's right hand when holding the tablet). Towards the bottom of the display are a virtual keyboard button 805 (for entering text), select button 806 (for mimicking the select button on a physical game controller), a dashboard button 807 (for opening the graphical user interface of the hosting service), a start button 808 (for providing game options and menu/pause functions), and a record button 809 (for recording brag clips as described above).

In FIG. 8B, labels are displayed next to the virtual controller 801 and the action buttons 803, 804, to instruct the user how to operate the virtual controls. As previously mentioned, the labels may be toggled on and off using a separate "labels" button. Alternatively, or in addition, the labels may appear automatically at specified times (e.g., at the beginning of a game, at times when no action is occurring in the game such as when one user scores a point, etc).

Figure 9:
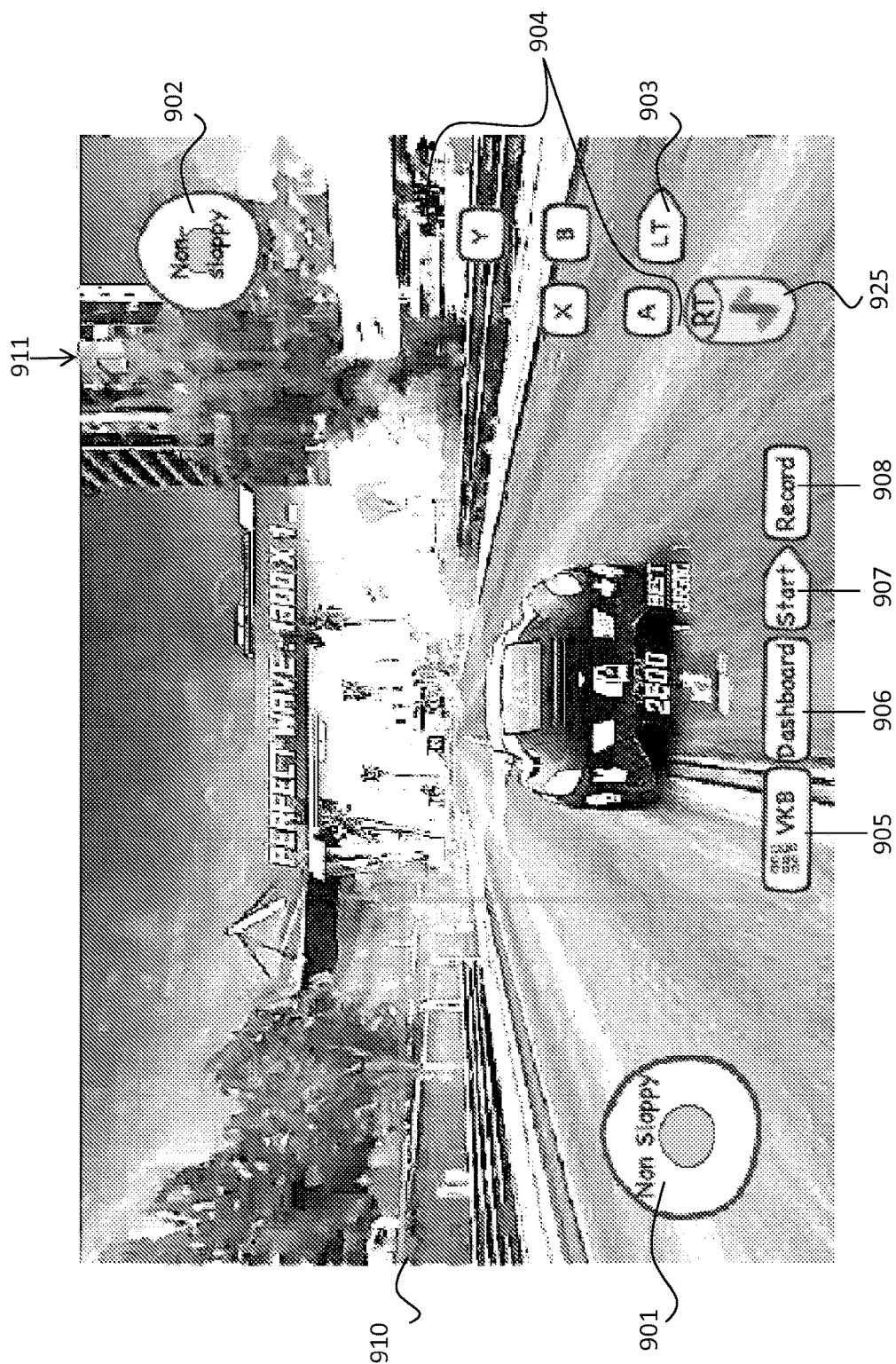

FIG. 9 illustrates yet another embodiment in which a first virtual controller 901 set to an absolute mode of operation ("non-sloppy") is positioned in the lower left quadrant of the tablet's display (in a region defined by lines 910) and a second virtual controller 902 also set to an absolute mode of operation is positioned in the upper right quadrant of the tablet's display (in a region defined by lines 911). Towards the right side of the display is a virtual left trigger 903 and a right slider trigger 925. As mentioned, the slider trigger may be configured to reset to zero when the user's finger stops touching (similar to a Gamepad trigger) or may be configured to stay at a current value set when the user's finger stops touching. Also illustrated to the right on the tablet's display are a set of X, Y, A, and B buttons 904 which have various defined functions depending on the video game being played.

Towards the bottom of the display are the virtual keyboard button 905 (for entering text), a dashboard button 906 (for opening the graphical user interface of the hosting service), a start button 907 (for providing game options and menu/pause functions), and a record button 908 (for recording brag clips as described above).

In one embodiment, the configuration of the virtual controller and other graphical user interface elements is stored in a database on the hosting service 210 (e.g., accessible via RAID array 105). Each video game or application hosted by the hosting service 210 is provided with its own default graphical user interface configuration. In one embodiment, each individual user of the hosting service 210 may make user-specific adjustments to the default configuration and store the adjustments stored in the database. For example, the user may modify features such as the location of the virtual controller and the virtual controller mode of operation (e.g., sloppy vs. non-sloppy).

When a client connects to a specific application or video game on the hosting service 210 the virtual user interface configuration is sent from the database, through the hosting service 210 down to the tablet-based client. In one embodiment, the virtual controller configuration is stored as a JavaScript Object Notation (JSON) string. However, the underlying principles of the invention are not limited to any particular type of program code.

When a tablet-based client 175 receives the graphical user interface configuration from the hosting service 210, it will render the user-specific one (if one exists) or the default one. In one embodiment, a user may upload new user-specific virtual pad configurations to the hosting service 210 and it will be stored in the database for that user for that game.

In one embodiment, the graphical user interface elements are stored in the hosting service database as a set of widgets (a small executable with graphical and interactive elements) with configuration data for each application or video game defining where the widget should be drawn, which widget to draw, how big to draw it (scale), the size of the hitbox (independent from the actual icon/image), text (if a label is used), specific configuration parameters for that widget (such as sensitivity for a thumbstick widget), and the action to take when the user interacts with widget. For example, each widget may be associated with a particular physical controller action (e.g., send a left mouse click, press the j-button on a keyboard, or press the right trigger on a gamepad, etc). In one embodiment the widgets execute locally on the tablet. In another embodiment the widgets execute remotely in hosting service 210. In yet another embodiment, parts of a widget execute in each the tablet and the hosting service 210.

Thus, in the examples described above, similar types of controls are displayed in consistent positions across different games, making it easier for the user to learn how to operate various games provided by the hosting service 210 on a tablet-based client.

Embodiments of the Invention for Entering Text Using a Virtual or Physical Game Controller One embodiment of the invention comprises a graphical user input allowing text to be entered efficiently in a video game or other application using nothing but a virtual or physical game controller. In this embodiment, the left thumbstick and A, B, X, and Y action buttons are used to quickly access the letters of the keyboard.

Figure 11:
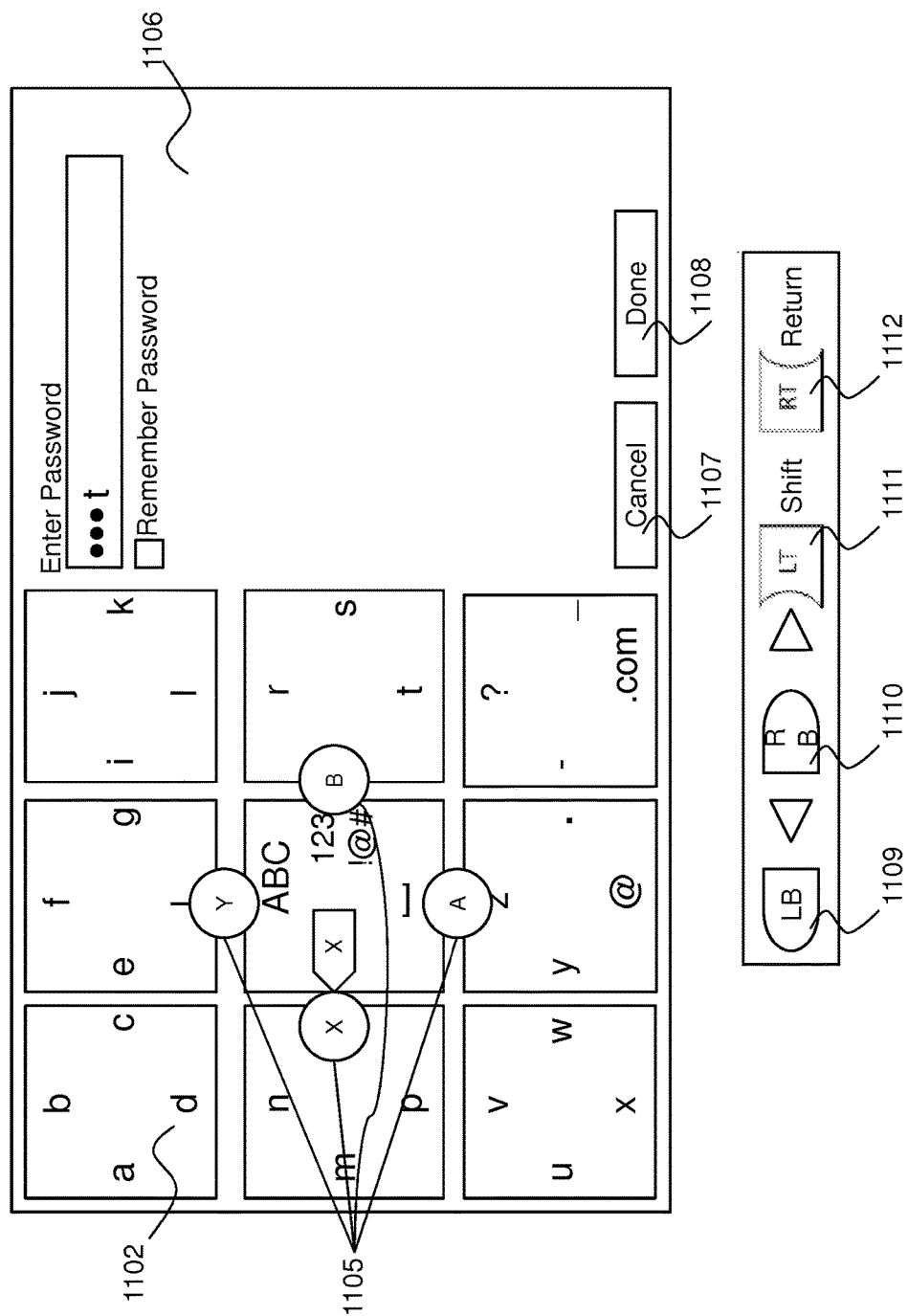
FIGS. 11-16 illustrate a graphical user interface for entering text using a virtual or physical controller.

FIG. 11 illustrates the graphical user interface employed in this embodiment which includes a 3×3 array of selectable boxes 1101 for selecting text (although the underlying principles of the invention are not limited to any particular number of boxes). In operation, a highlight element 1103 is moved from one box to the next via the left thumbstick of the game controller 101. The center box is shown highlighted in FIG. 11. When a particular box having a desired alphanumeric character is highlighted, A, B, X, and Y elements 1105 appear on each edge of the box as shown. A user may then quickly select a particular alphanumeric character within the highlighted box by selecting the A, B, X, or Y button on the controller corresponding to that alphanumeric character.

Figure 13:
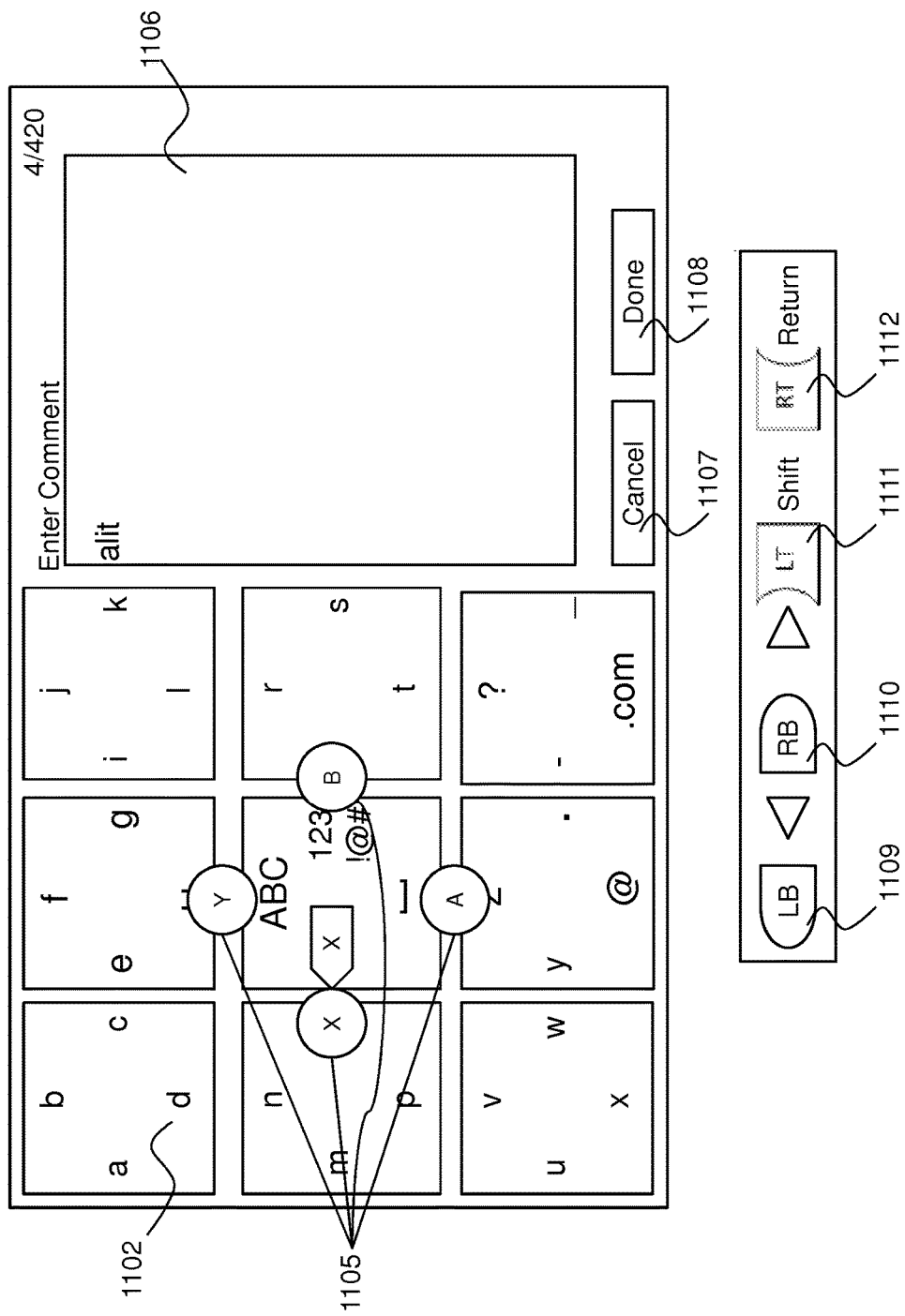
Figure 14:
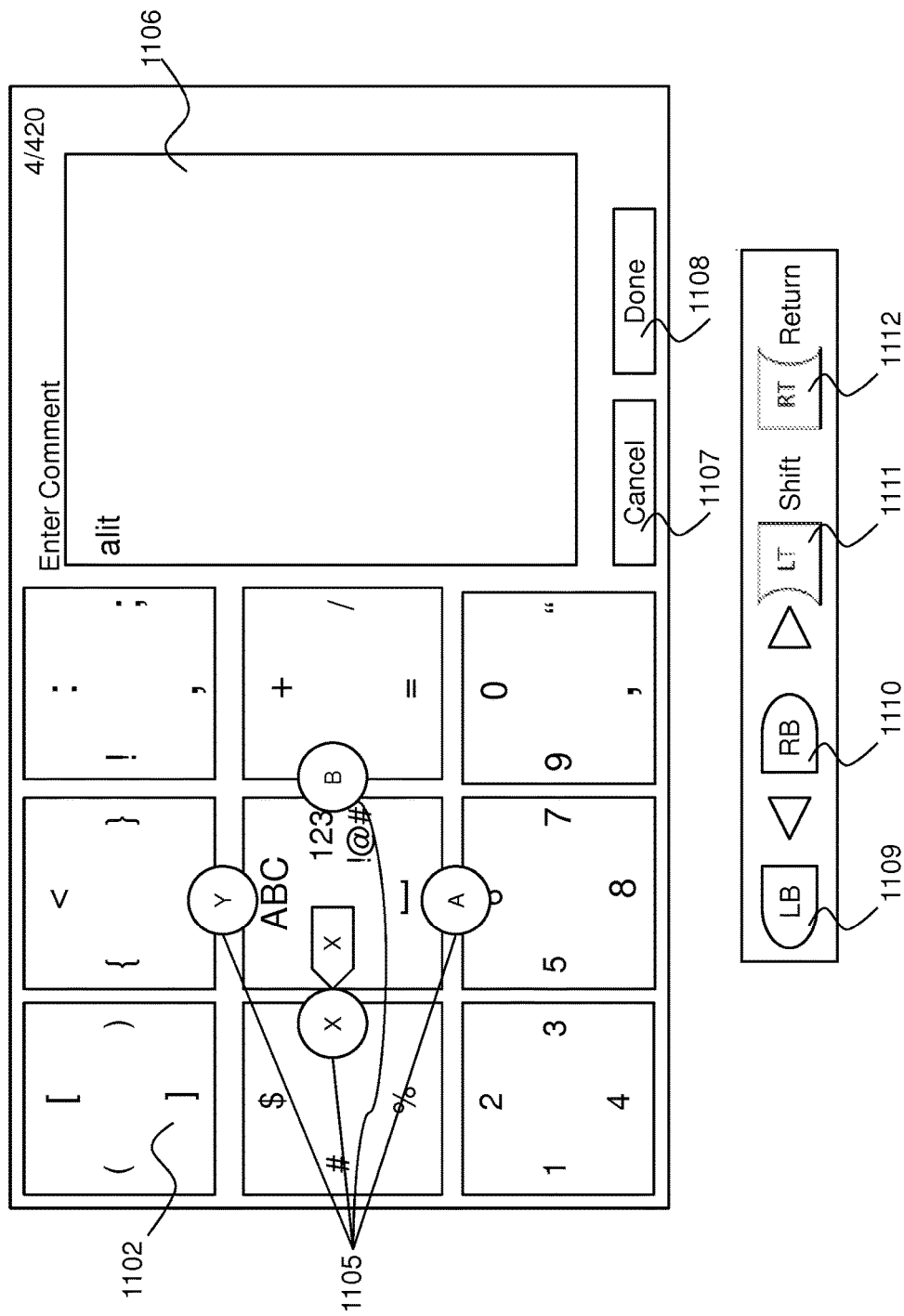

In the particular example shown in FIG. 11, selecting the A key will cause the displayed underscore character to be entered in the text entry region 1106, selecting the X key will generate a backspace within the text entry region 1106, selecting the Y key will update the set of boxes with all capital characters (see FIG. 13), and selecting the B key will update the set of boxes with numbers and non-alphabetic characters (e.g., numbers and symbols as shown in FIG. 14).

In one embodiment, the positioning of the A, B, X, and Y elements 1105 as each box is highlighted. Thus, using the left thumbstick, if the user moves the highlight element to box 1102 in FIG. 11, the X element would select the letter "a," the Y element would select the letter "b," the B element would select the letter "c," and the A element would select the letter "d."

In one embodiment, a "cancel" button 1107 may be selected via the thumbstick to cancel the text entry GUI (e.g., by moving the highlight element to the right from the right side of the array of boxes), and a "done" button 1108 may similarly be selected when text entry is complete. Note that the text entry region 1106 in the example shown in FIG. 11 is for entering a password.

As indicated towards the bottom of FIG. 11, other buttons on the game controller may be assigned for further simplify text entry. Here, the left bumper is assigned a move left function, the right bumper is assigned a move right function, the left trigger is assigned a shift function (e.g., to shift between lower case, upper case, and numbers/symbols within the array of boxes), and the right bumper is assigned a return function.

Figure 12:
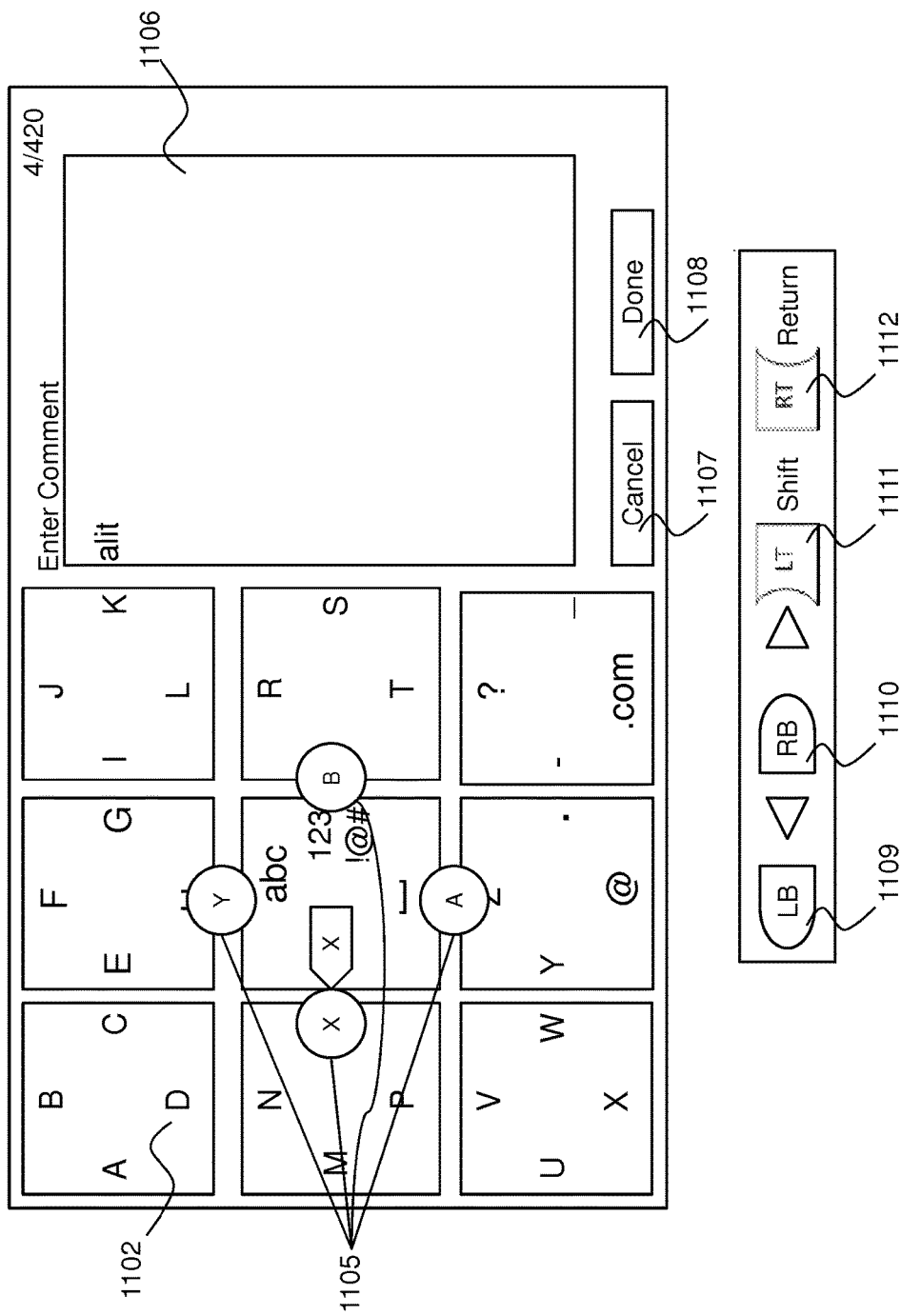

FIG. 12 illustrates another example in which a comment is being entered in the text entry region of the display. Other buttons shown in FIG. 12 may be assigned the same functions as in FIG. 11.

FIG. 13 illustrates an example in which the user has previously selected lowercase characters (e.g., by selecting Y from the center box shown in FIG. 11 or by selecting the left trigger (shift) key). Once selected, the center box was repopulated with a similar set of selectable options, the only difference being that a upper case option is now selectable via the Y key (as indicated by the upper case graphic "ABC"). Maintaining the center box in this consistent manner makes it easier for the end user to remember how to navigate between the different alphanumeric character sets.

FIG. 14 illustrates an embodiment in which numbers and symbols have been selected resulting in the array of boxes being populated with numbers and symbols (e.g., by selecting the B key from the GUI shown in FIG. 13). Once again, the center box is repopulated in a consistent manner to ease navigation. The remaining portions of the GUI have not changed.

Figure 15:
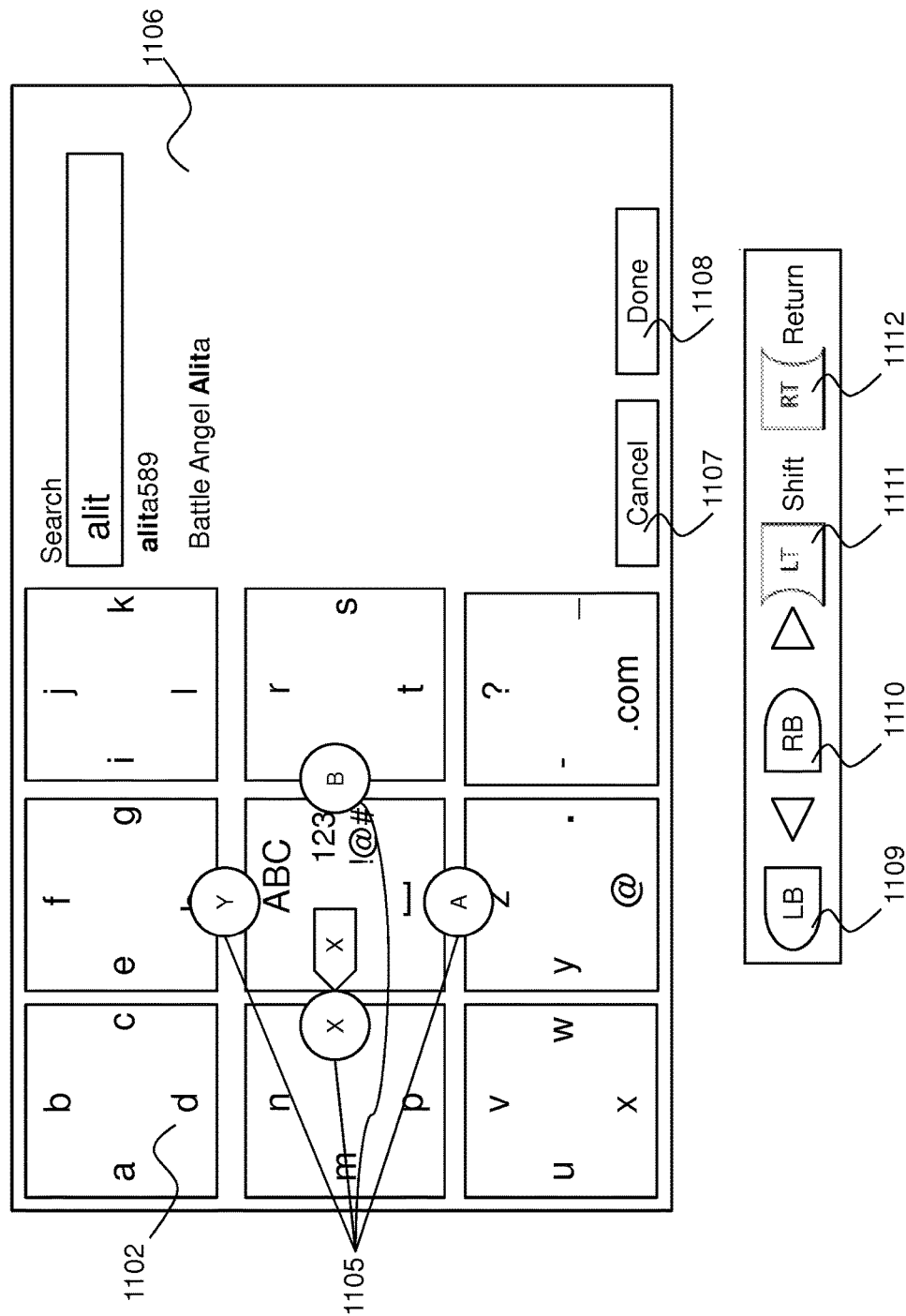

FIG. 15 illustrates an embodiment in which the typing has resulted in a list being generated within the text entry region 1106. In this case, any entries starting with the first set of entered characters ("alit") are placed at the top of the list, followed by entries containing the character string ("alit"). The user may then move the highlight element down to select entries in the list and select an element (e.g., using the right trigger button or other selection button).

Figure 16:
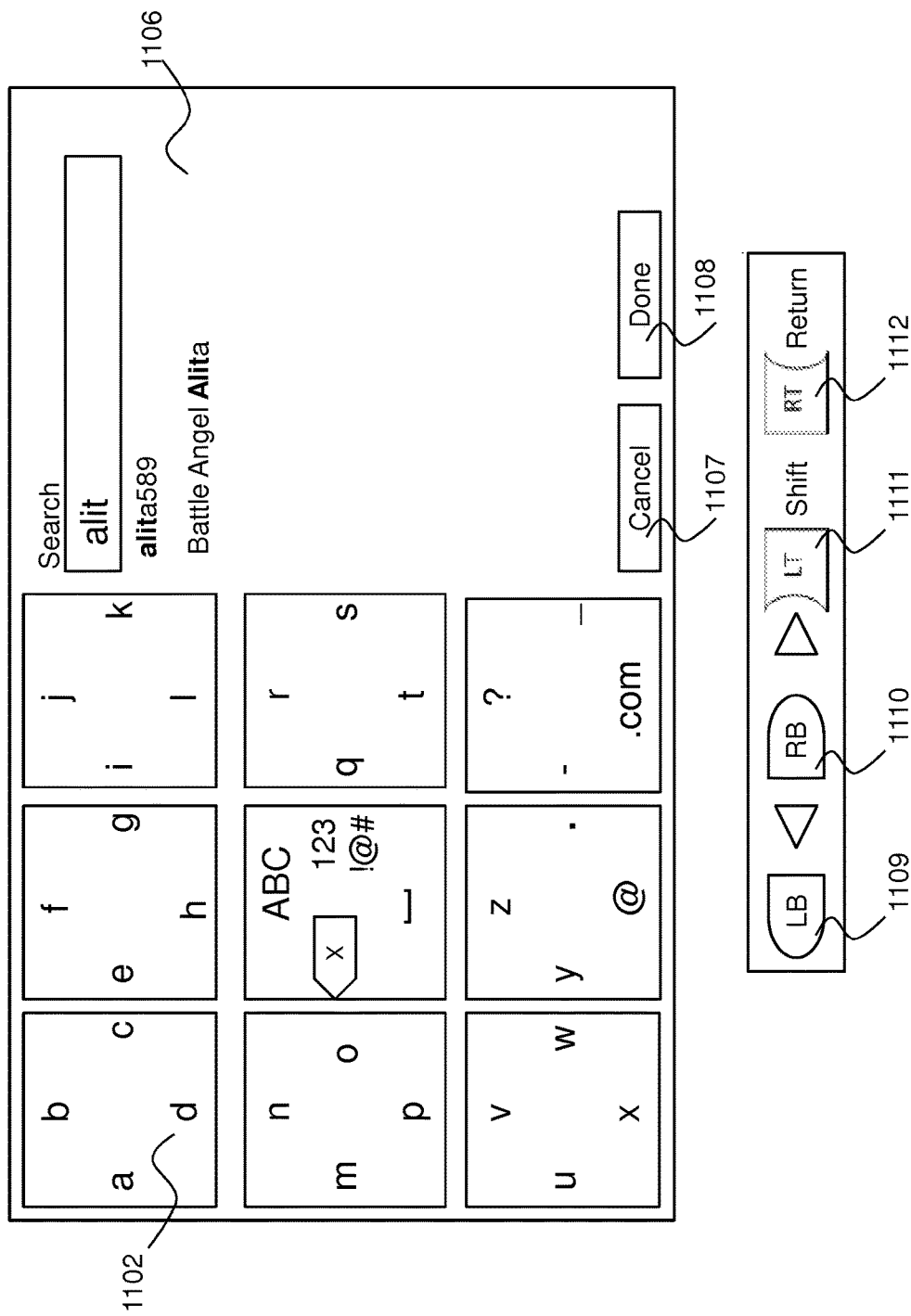

In FIG. 16, the user has selected the first entry in the text entry region 1106. The user may thereafter move the highlighted down to the done key to select the highlighted entry.

In one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, the modules may be implemented on a programmable digital signal processor ("DSP") such as a Texas Instruments' TMS320x architecture (e.g., a TMS320C6000, TMS320C5000, . . . etc). Various different DSPs may be used while still complying with these underlying principles.

Embodiments may include various steps as set forth above. The steps may be embodied in machine-executable instructions which cause a general-purpose or special-purpose processor to perform certain steps. Various elements which are not relevant to these underlying principles such as computer memory, hard drive, input devices, have been left out of some or all of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

The invention claimed is:

1. A method, comprising:
    communicating, by a client device, with a hosting service a selection of an online application;
    receiving, by the client device, streaming video content from execution of the online application on a server of the hosting service, for rendering at a user interface of the client device;
    receiving, by the client device, program code for a configuration of a virtual controller used for interacting with the streaming video content from the hosting service, the program code being specific for the online application, wherein the program code includes user specific adjustments to the configuration defined for the online application from a previous configuration session;
    executing, by the client device, the program code of the virtual controller, the execution causing an interactive image of the virtual controller to be rendered at the user interface, the interactive image of the virtual controller identifying controls of the virtual controller that are specific for the client device;
    receiving, by the client device, user input via the controls provided by the virtual controller to communicate functionality that parallels functionality of buttons of a physical game controller, the user input being interpreted based on the user specific adjustments, the user input provided to control aspects of the online application being executed by the server.

2. The method of claim 1, wherein the program code of the virtual controller defined for the client device is stored in a database of the hosting service and the user specific adjustments included in the program code are provided by a user during previous interactive sessions of the online application.

3. The method of claim 2, further includes receiving additional user specific adjustments to the configuration of the virtual controller during current session, the additional user specific adjustments from the current session updated to the program code of the virtual controller stored in the database for use during subsequent sessions of the online application.

4. The method of claim 1, wherein the user specific adjustment causes rendering of the interactive image of the virtual controller in a specific region of the display of the client device.

5. The method of claim 1, wherein the configuration of the virtual controller specifies a size of the virtual controller and a region on the user interface for rendering the virtual controller, wherein the size and the region being configurable by a user.

6. The method of claim 1, wherein the configuration of the virtual controller specifies a rendering state of the virtual controller when rendered on the user interface, wherein the rendering state of the virtual controller is one of transparent state and semi-transparent state.

7. The method of claim 1, wherein the configuration of the virtual controller specifies sensitivity index for different controls of the virtual controller.

8. The method of claim 1, wherein the user specific adjustment includes rendering the image of the virtual controller in a relative mode or an absolute mode, wherein in the relative mode the interactive image of the virtual controller is drawn on the user interface at an initial touch point and the user input on the display is determined in relation to the initial touch point, and
    wherein in the absolute mode the interactive image of the virtual controller is drawn in a fixed location on the user interface, wherein the fixed location is determined based on the user specific adjustment to the configuration.

9. The method of claim 1, wherein the program code of the configuration of the virtual controller, when executed, produces the interactive image of the virtual controller that includes graphics for buttons that are configurable on a per user basis.

10. The method of claim 1, wherein the program code of the configuration of the virtual controller, when executed, produces the interactive image of the virtual controller that includes graphics for buttons that are configurable based on content of the online application.

11. A non-transitory computer readable storage medium having program instructions, which when executed by a processor of a client device performs a method, the program instructions comprising:
    program instructions for communicating with a hosting service a selection of an online application;
    program instructions for receiving streaming video content from execution of the online application on a server of the hosting service, for rendering at a user interface of the client device;
    program instructions for receiving program code for a configuration of a virtual controller used for interacting with the streaming video content from the hosting service, the program code being specific for the online application, wherein the program code includes user specific adjustments to the configuration defined for the online application from a previous configuration session;

program instructions for executing the program code of the virtual controller, the execution causing an interactive image of the virtual controller to be rendered at the user interface, the interactive image of the virtual controller identifying controls of the virtual controller that are specific for the client device;

program instructions for receiving user input via the controls provided by the virtual controller to communicate functionality that parallels functionality of buttons of a physical game controller, the user input being interpreted based on the user specific adjustments, the user input provided to control aspects of the online application being executed by the server.

12. The computer readable storage medium of claim 11, further includes program instructions for receiving additional user specific adjustments to the configuration of the virtual controller during current session, the additional user specific adjustments from the current session updated to the program code of the virtual controller stored in a database for use during subsequent sessions of the online application.

13. The computer readable storage medium of claim 11, wherein the program instructions for executing the program code further includes program instructions for rendering the interactive image of the virtual controller in a relative mode or an absolute mode, wherein in the relative mode, the interactive image of the virtual controller to be drawn on the user interface at an initial touch point and the user input on the display is computed in relation to the initial touch point, and wherein in the absolute mode the interactive image of the virtual controller is drawn in a fixed location on the user interface, wherein the fixed location is determined based on user specific adjustment to the configuration.

14. A method, comprising:

communicating, by a client device, with a cloud hosting service a selection of an online application;

receiving, by the client device, streaming video content from execution of the online application on a server of the cloud hosting service for rendering at a display screen associated with the client device, and program code for a configuration of a virtual controller defined during a previous configuration session, the virtual controller used for interacting with the streaming video content provided by the cloud hosting service, the streaming video content and the program code being specific for a type of the client device used in interacting with the online application;

executing, by the client device, the program code of the virtual controller, the execution causing an interactive image of the virtual controller to be rendered at the user interface, the interactive image of the virtual controller identifying controls of the virtual controller that are specific for the type of the client device;

receiving, by the client device, user input to the online application via the controls provided by the virtual controller to communicate functionality that parallels functionality of buttons of a physical game controller, the user input provided to control aspects of the online application being executed by the server.

15. The method of claim 14, wherein the configuration of the virtual controller includes user specific adjustments to the configuration previously defined for the online application, and wherein the user input provided via the controls is interpreted based on the user specific adjustments.

16. The method of claim 14, wherein the type of client device used in interacting with the online application is determined during initialization of the client device.

17. The method of claim 14, wherein the streaming video content provided by the server to the client device is selected based on a format that is appropriate for a type of the display screen associated with the client device.

18. The method of claim 14, wherein the display screen is external to the client device and is communicatively connected to the client device, and the streaming video content provided for rendering is formatted for the external display screen.

19. The method of claim 14, wherein the configuration of the virtual controller specifies one or more modes of operation, a location and a mode of operation of the controls in the virtual controller specified based on a type of the online application and on user specific adjustments to the configuration.

20. The method of claim 14, wherein the configuration of the virtual controller specifies a size of the virtual controller and a region on the user interface of the display screen for rendering the virtual controller, wherein the size and the region being specific for the online application and is configurable using user specific adjustments.

* * * * *